(12) United States Patent
Nakamura et al.

(10) Patent No.: US 12,244,960 B2
(45) Date of Patent: Mar. 4, 2025

(54) INFORMATION DISPLAY SYSTEM, INFORMATION DISPLAY METHOD, AND NON-TRANSITORY RECORDING MEDIUM

(71) Applicants: Naoto Nakamura, Kanagawa (JP); Hiroyuki Satoh, Kanagawa (JP); Koretaka Ogata, Kanagawa (JP); Kanta Shimizu, Kanagawa (JP)

(72) Inventors: Naoto Nakamura, Kanagawa (JP); Hiroyuki Satoh, Kanagawa (JP); Koretaka Ogata, Kanagawa (JP); Kanta Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

(21) Appl. No.: 18/174,895

(22) Filed: Feb. 27, 2023

(65) Prior Publication Data
US 2023/0300290 A1 Sep. 21, 2023

(30) Foreign Application Priority Data
Mar. 16, 2022 (JP) .................................. 2022-041752

(51) Int. Cl.
*H04N 5/74* (2006.01)
*G06F 3/01* (2006.01)
*G06T 7/70* (2017.01)

(52) U.S. Cl.
CPC .............. *H04N 5/74* (2013.01); *G06F 3/013* (2013.01); *G06T 7/70* (2017.01); *G06T 2207/30196* (2013.01)

(58) Field of Classification Search
CPC .......... G06F 3/013; G06F 3/011; G06F 1/163; H04N 5/74; H04N 9/3173; G06T 7/70; G06T 2207/30196
See application file for complete search history.

(56) References Cited

U.S. PATENT DOCUMENTS

| | | |
|---|---|---|
| 2014/0247263 A1 | 9/2014 | Wilson et al. |
| 2015/0364140 A1 | 12/2015 | Thorn |
| 2019/0279407 A1* | 9/2019 | McHugh .................. G06F 3/011 |
| 2019/0371279 A1* | 12/2019 | Mak ....................... G09G 5/373 |
| 2020/0052254 A1 | 2/2020 | Ohshima et al. |
| 2020/0228763 A1* | 7/2020 | Ikeda ...................... G03B 21/00 |
| 2020/0250412 A1* | 8/2020 | Suzuki .................... G09G 5/00 |
| 2021/0110790 A1* | 4/2021 | Shigeta ................ H04N 9/3194 |
| 2021/0117680 A1* | 4/2021 | Chaudhri ............ G06F 3/04847 |
| 2021/0382617 A1 | 12/2021 | Tokuchi |

FOREIGN PATENT DOCUMENTS

| | | |
|---|---|---|
| JP | 2020-027271 | 2/2020 |
| JP | 2020-129356 | 8/2020 |

OTHER PUBLICATIONS

Extended European Search Report for 23159000.1 mailed on Aug. 11, 2023.

* cited by examiner

*Primary Examiner* — Temesghen Ghebretinsae
*Assistant Examiner* — Ivelisse Martinez Quiles
(74) *Attorney, Agent, or Firm* — IPUSA, PLLC

(57) ABSTRACT

An information display system includes circuitry to acquire detection information including information on a posture of a user and information on a line of sight of the user, project an image onto a projection destination located in a projection direction with respect to the user, and cause the image to be projected onto the projection destination based on the detection information and information on the projection direction.

10 Claims, 24 Drawing Sheets

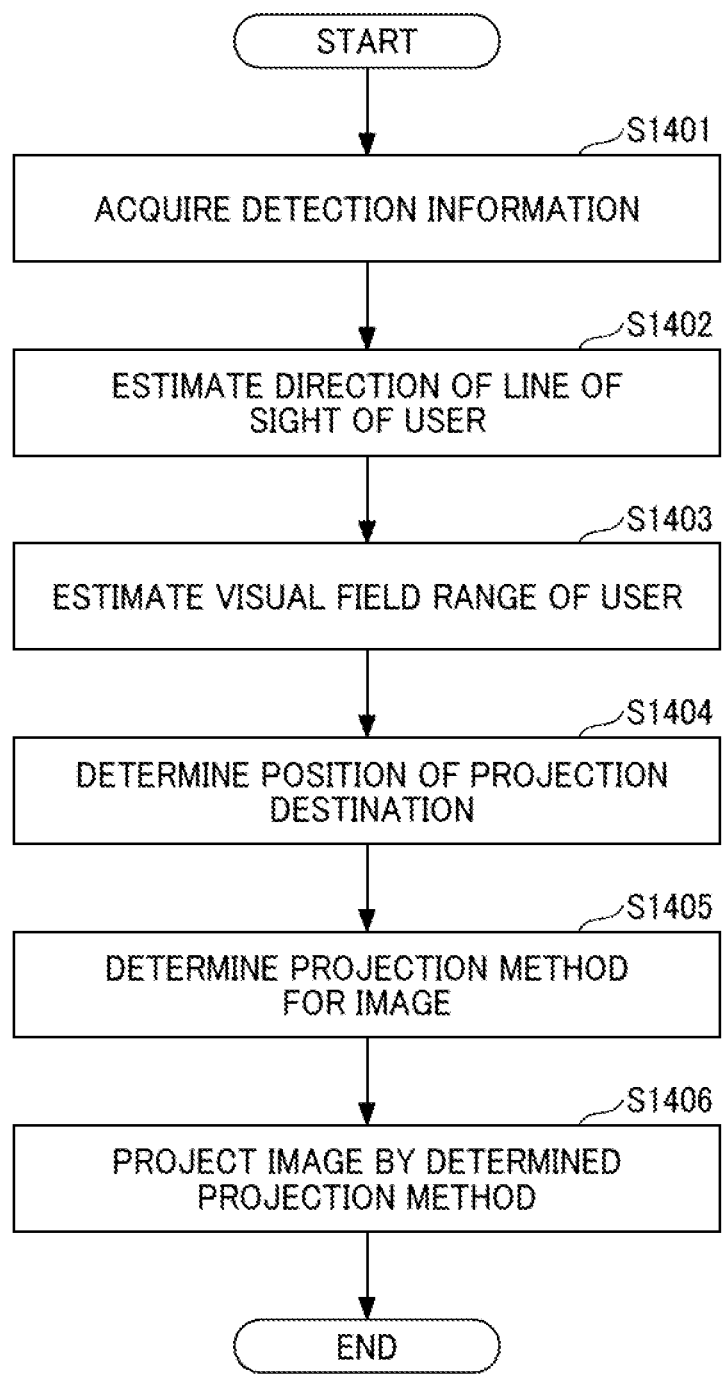

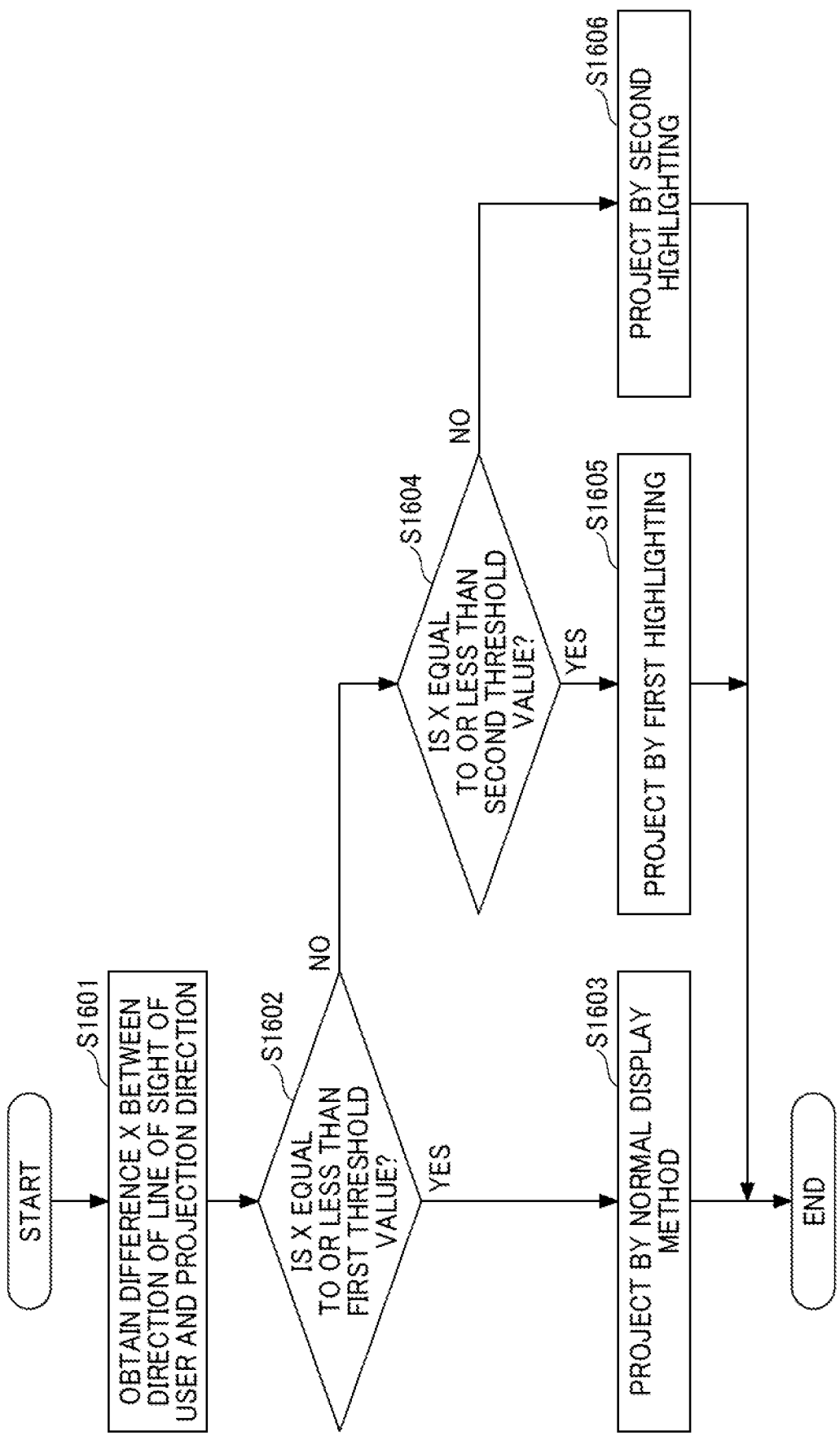

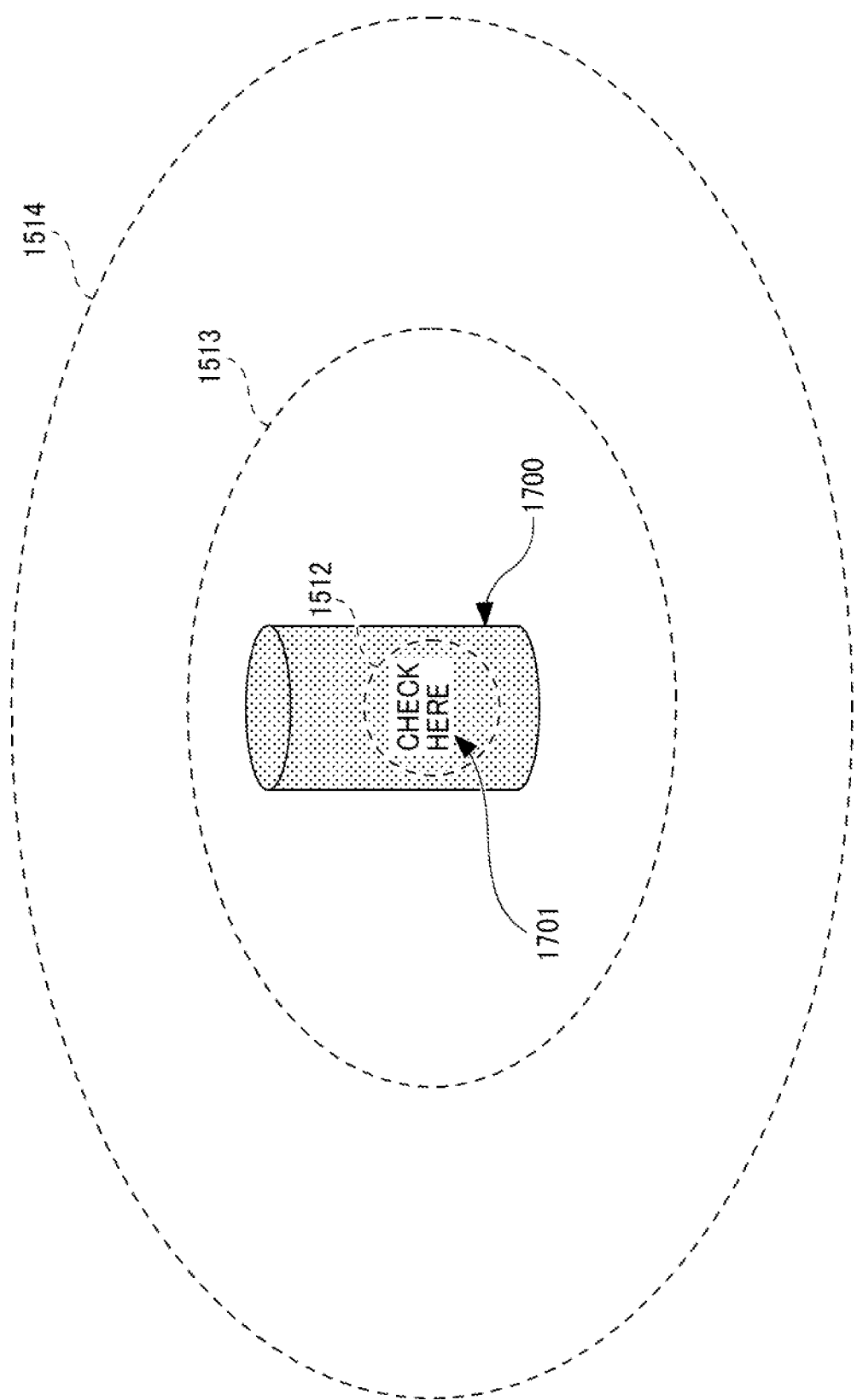

INFORMATION DISPLAY SYSTEM, INFORMATION DISPLAY METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-041752, filed on Mar. 16, 2022, in the Japan Patent Office, the entire disclosure of which is hereby incorporated by reference herein.

BACKGROUND

Technical Field

Embodiments of the present disclosure relate to an information display system, an information display method, and a non-transitory recording medium.

Related Art

A technology for providing information on an object that is present in front of a user by using a wearable terminal worn by the user has been developed.

For example, a known technology specifies display data and displays the display data on a glasses-type terminal worn by a user on his or her head. The display data is specified based on three dimensional data corresponding to a captured image and position information, and a direction of a line of sight of the user. The direction of the line of sight of the user is estimated based on sensor information.

For example, various information on a targeted object is superimposed and displayed on the targeted object to which a user pays attention.

SUMMARY

An embodiment of the present disclosure includes an information display system including circuitry to acquire detection information including information on a posture of a user and information on a line of sight of the user, project an image onto a projection destination located in a projection direction with respect to the user, and cause the image to be projected onto the projection destination based on the detection information and information on the projection direction.

An embodiment of the present disclosure includes an information display method including acquiring detection information including information on a posture of a user and information on a line of sight of the user, projecting an image onto a projection destination located in a projection direction with respect to the user, and causing the image to be projected onto the projection destination based on the detection information and information on the projection direction.

An embodiment of the present disclosure includes a non-transitory recording medium storing a plurality of instructions which, when executed by one or more processors, causes the processors to perform the above-described method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 14 is a flowchart illustrating an example of a process performed by the information display system according to the exemplary embodiment of the disclosure;

FIG. 16 is a flowchart illustrating an example of a process of determining a projection method according to a first embodiment of the disclosure;

FIG. 17 is a diagram illustrating an example of a normal display method according to the first embodiment of the disclosure;

Figure 1:
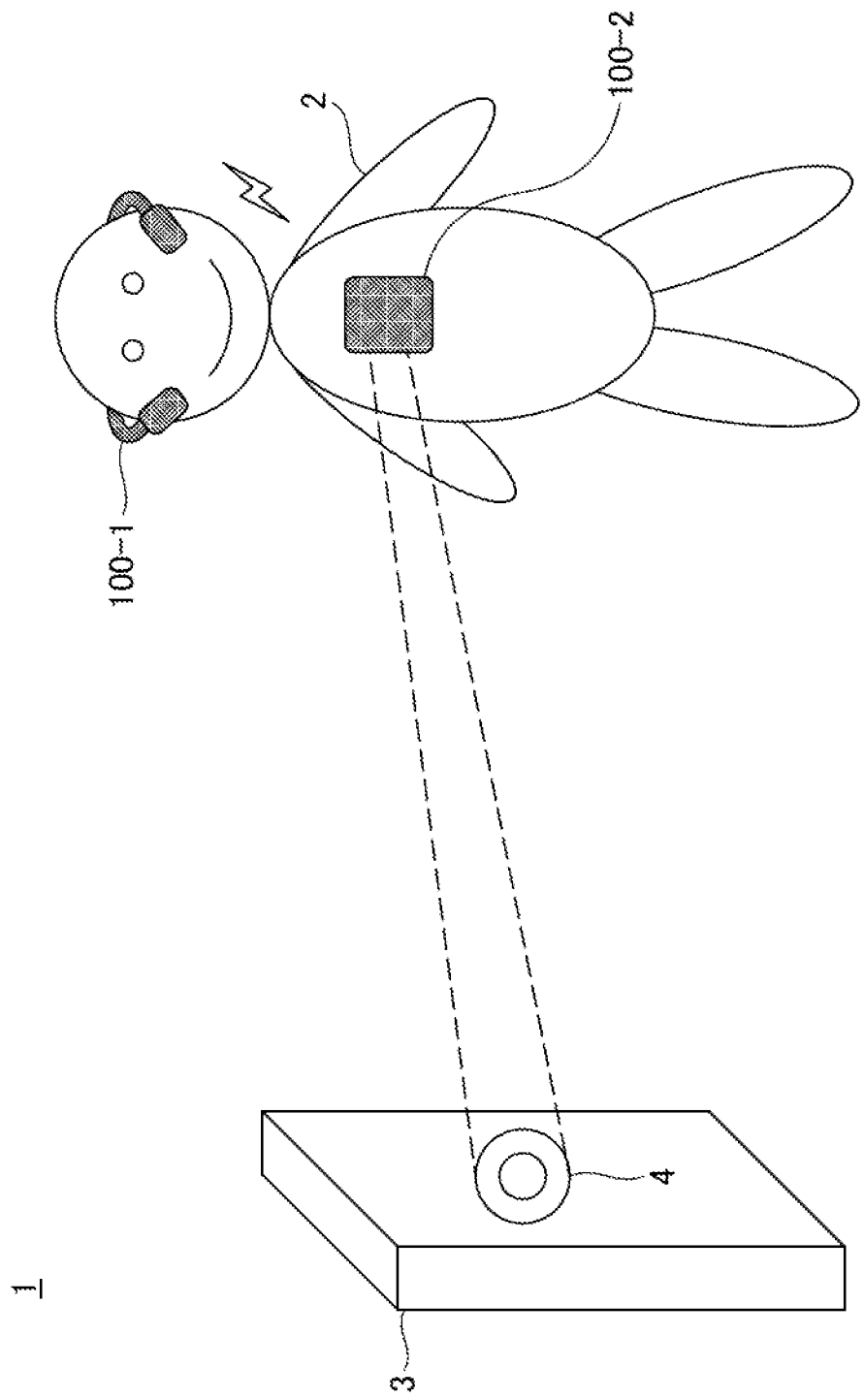
FIG. 1 is a diagram for describing an overview of an information display system according to an exemplary embodiment of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An exemplary embodiment of the present disclosure is described below with reference to the attached drawings.
Overview FIG. 1 is a diagram for describing an overview of an information display system according to an embodiment.

An information display system 1 includes, for example, a first wearable terminal 100-1 worn by a user 2 on the head and a second wearable terminal 100-2 worn on the body, or the torso, such as the chest or the shoulder. The first wearable terminal 100-1 and the second wearable terminal 100-2 are communicably connected to each other by wireless communication or wired communication.

The first wearable terminal 100-1 includes, for example, one or more peripheral cameras and has a function of acquiring an image including a video image of the periphery of the user 2. The first wearable terminal 100-1 includes, for example, an inertial measurement unit (IMU) or an electro-oculogram (EOG) sensor that has a function of acquiring detection information used for estimating the line of sight of the user 2.

The second wearable terminal 100-2 includes, for example, one or more projectors, and has a function of projecting an image 4 onto a projection destination 3 in a predetermined projection direction with respect to the user 2. The projection destination in the description includes an object, or a targeted object, onto which an image, or information, to be projected is projected. The projection destination may be referred to as a projection destination object. In addition, the second wearable terminal 100-2 includes, for example, a three dimensional sensor such as light detection and ranging (LiDAR) that acquires three dimensional point cloud data corresponding to surroundings of the user 2, a wearer-image capturing camera that captures an image of the user wearing the first wearable terminal 100-1.

The information display system 1 acquires, for example, detection information including information on the posture of the user 2 or information on the line of sight of the user 2 detected by the first wearable terminal 100-1 or the second wearable terminal 100-2. When the image 4 is projected onto the projection destination 3 in a predetermined projection direction with respect to the user, the information display system 1 controls the projection method for the image 4 to be projected onto the projection destination 3 based on the acquired detection information and information related to the projection direction.

As a specific example, the information display system 1 estimates a direction of the line of sight of the user 2 from the acquired detection information, and in a case where a difference between the direction of the line of sight of the user 2 and the projection direction is equal to or greater than a threshold value, the information display system 1 displays the image 4 to be projected onto the projection destination 3 in a highlighting manner (for example, blinking display, vibrating display, or inverted display).

As another example, when the difference between the direction of the line of sight of the user 2 and the projection direction is larger, the information display system 1 displays an image indicating the position or the direction of the projection destination on another projection destination in a visual field of the user 2.

As described above, according to the information display system 1 of the present embodiment, the user 2 is caused to appropriately visually recognize information related to an object to which the user 2 does not currently pay close attention in his or her surroundings, using the wearable terminal worn by the user 2.

System Configuration

Figure 2A:
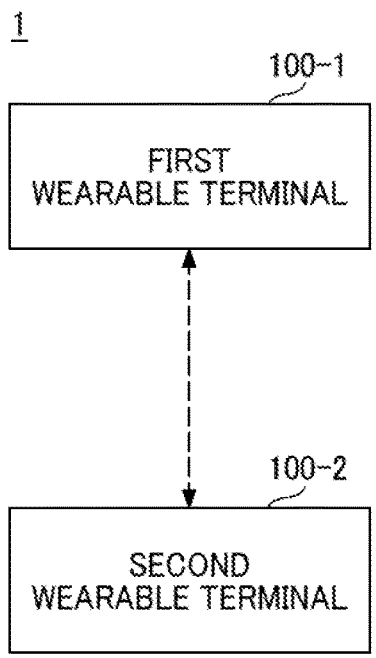
FIGS. 2A and 2B are block diagrams each illustrating an example of a system configuration of the information display system according to the exemplary embodiment of the disclosure.
Figure 2B:
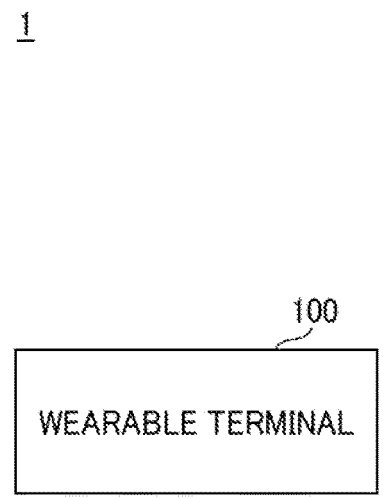
Figure 3:
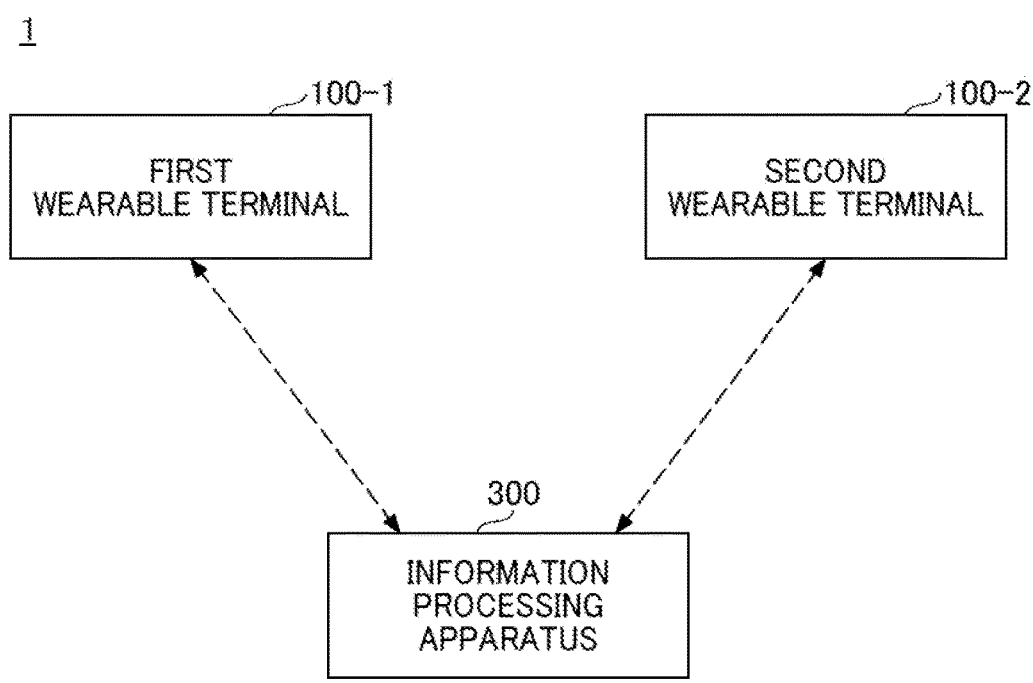
FIG. 3 is a block diagram illustrating another example of a system configuration of the information display system according to the exemplary embodiment of the disclosure.

FIGS. 2A, 2B, and 3 are block diagrams each illustrating an example of a system configuration of an information display system according to an embodiment. In the example of FIG. 2A, in the information display system 1, the first wearable terminal 100-1 and the second wearable terminal 100-2 described with reference to FIG. 1 are communicably connected to each other by wireless communication or wired communication.

However, this is merely an example, and the first wearable terminal 100-1 and the second wearable terminal 100-2 may be configured by a single wearable terminal such as a wearable terminal 100 as illustrated in FIG. 2B. In this case, the wearable terminal 100 may be worn on the head of the user 2 similarly to the first wearable terminal 100-1, or may be worn on the body of the user 2 similarly to the second wearable terminal 100-2.

Furthermore, as illustrated in FIG. 3, the information display system 1 may include an information processing apparatus 300 connected to the first wearable terminal 100-1 and the second wearable terminal 100-2 so as to communicate with each other by wireless communication or wired communication.

The information processing apparatus 300 is, for example, an information terminal having a configuration of a computer such as a personal computer (PC), a tablet terminal, or a smartphone. The information processing apparatus 300 executes a predetermined program to control the first wearable terminal 100-1 and the second wearable terminal 100-2, thereby controlling the information display method according to the present embodiment.

Hardware Configuration

Next, an example of a hardware configuration of each device included in the information display system 1 is described.

First Wearable Terminal

Figure 4:
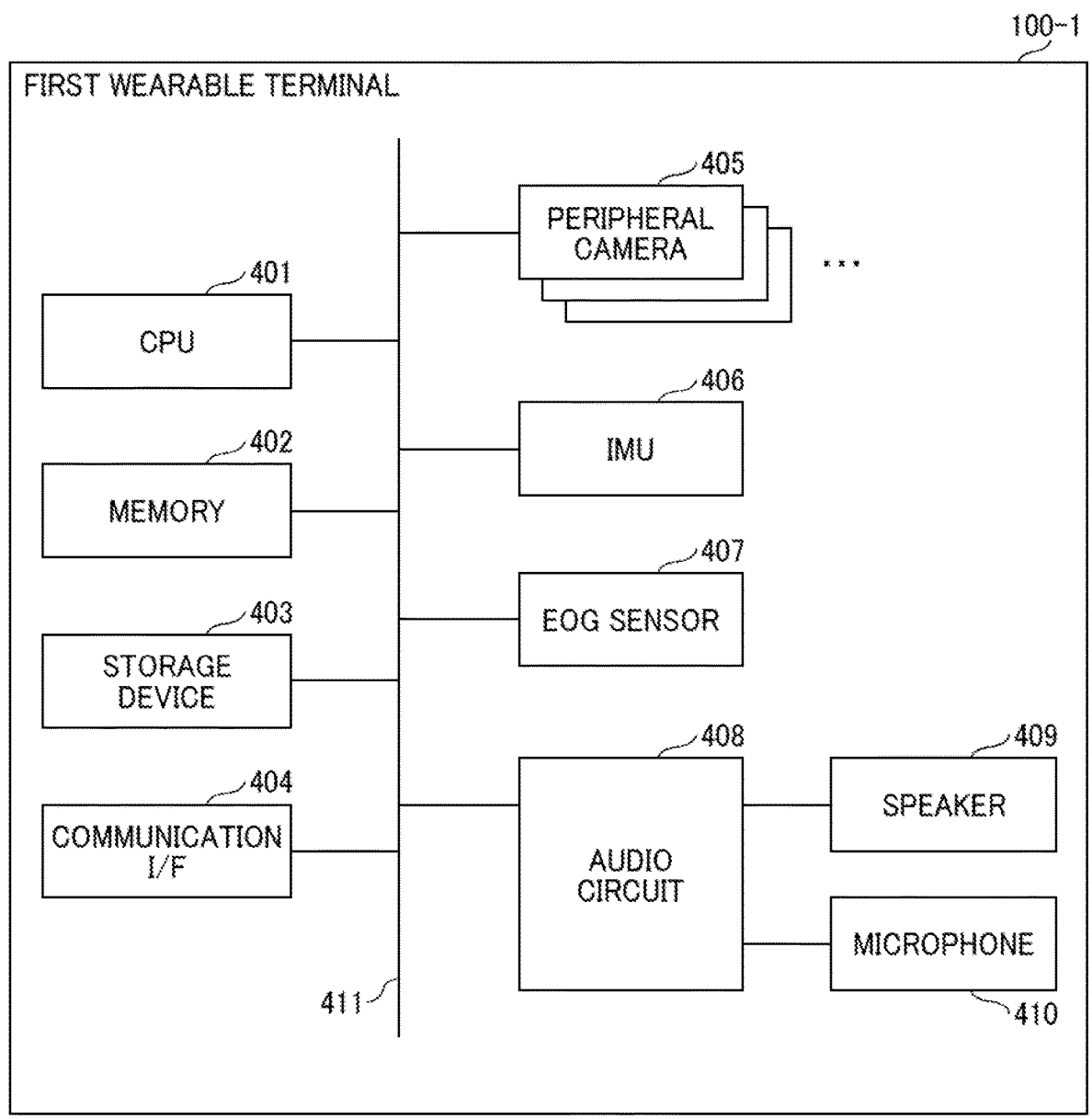
FIG. 4 is a block diagram illustrating an example of a hardware configuration of a first wearable terminal according to the exemplary embodiment of the disclosure.

FIG. 4 is a block diagram illustrating an example of a hardware configuration of a first wearable terminal according to the present embodiment. The first wearable terminal 100-1 includes, for example, a central processing unit (CPU) 401, a memory 402, a storage device 403, a communication interface (I/F) 404, one or more peripheral cameras 405, a IMU 406, an EOG sensor 407, an audio circuit 408, a speaker 409, a microphone 410, and a bus 411.

The CPU 401 is, for example, an arithmetic device (processor) that implements each function of the first wearable terminal 100-1 by reading a program or date stored in a storage device such as the storage device 403 onto the memory 302 and executing processing. The memory 402 includes, for example, a random access memory (RAM) used as a work area for the CPU 401 and a read only memory (ROM) that stores a program for starting the CPU 401. The storage device 403 is a large-capacity nonvolatile storage device that stores an operating system (OS), an application, and various data, and is implemented by, for example, a solid state drive (SSD) or a hard disk drive (HDD), for example.

The communication I/F 304 is a communication interface for communicating with the second wearable terminal 100-2, using such as near field communication, a wireless local area network (LAN), or wired communication. In addition, the communication I/F 304 includes a communication interface using such as a local area network (LAN) or a wide area network (WAN) for connecting to a communication network such as the Internet or a local area network.

The one or more peripheral cameras 405 are image capturing devices that capture images (video images) around the user 2, namely images corresponding to surrounding of the user 2. The peripheral camera 405 may be an omnidirectional camera or a spherical camera that captures an omnidirectional image (video image) by itself, or may be configured by a plurality of cameras. The information display system 1 can perform self-localization and visual simultaneous localization and mapping (SLAM) for creating an environment map using, for example, images captured by the one or more peripheral cameras 405.

The IMU 406 is, for example, an inertial measurement device that acquires posture information of the user 2.

For example, the IMU 406 detects three dimensional angular velocities and accelerations by a triaxial gyro sensor and a three-direction acceleration sensor. The EOG sensor 407 is an electrooculography sensor for estimating the line of sight of the user 2. The first wearable terminal 100-1 includes at least one of the IMU 406 and the EOG sensor 407.

The audio circuit 408 outputs an audio signal to the speaker 409 under the control of the CPU 401, and amplifies an audio signal input from the microphone 410. The speaker 409 converts the audio signal input from the audio circuit 408 into audio and outputs the audio. The microphone 410 acquires surrounding audio, converts the audio into an audio signal, and outputs the audio signal to the audio circuit 408. The first wearable terminal 100-1 may not include a part or all of the audio circuit 408, the speaker 409, and the microphone 410. The bus 411 is commonly connected to the above-described components, and transmits, for example, address signals, data signals, and various control signals.

Second Wearable Terminal

Figure 5:
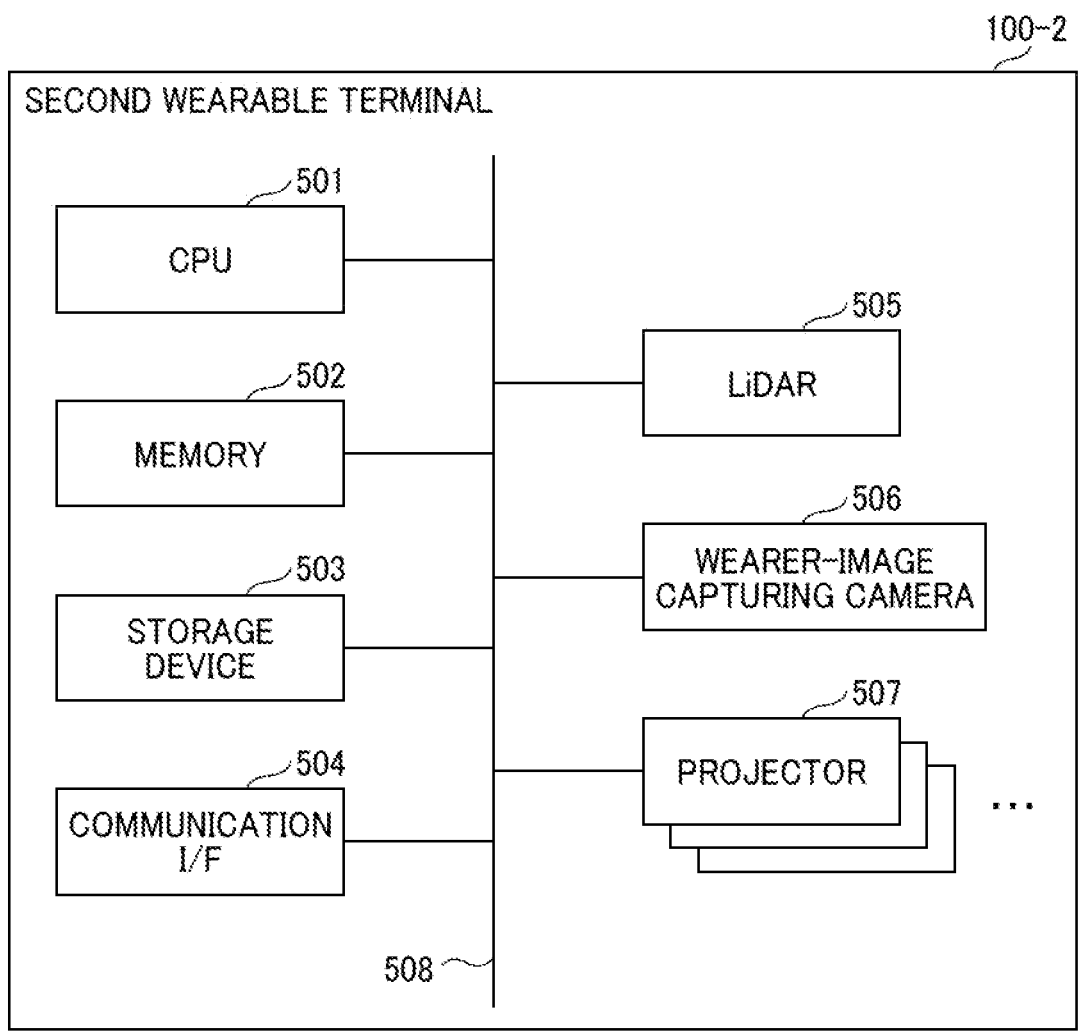
FIG. 5 is a block diagram illustrating an example of a hardware configuration of a second wearable terminal according to the exemplary embodiment of the disclosure.

FIG. 5 is a block diagram illustrating an example of a hardware configuration of a second wearable terminal according to the present embodiment. The second wearable terminal 100-2 includes, for example, a CPU 501, a memory 502, a storage device 503, a communication I/F 504, a LiDAR 505, a wearer-image capturing camera 506, one or more projectors 507, and a bus 508. Among them, the CPU 501, the memory 502, the storage device 503, the communication I/F 504, and the bus 508 are substantially the same as the CPU 401, the memory 402, the storage device 403, the communication I/F 404, and the bus 411 described in FIG. 4, and thus description thereof is omitted.

The LiDAR 505 is a distance measuring device that measures a distance to an object by irradiating the object with light such as laser light and detecting the reflection light with an optical sensor. The LiDAR 505 is mainly used to acquire information on the distance to a surface of the projection destination, the inclination of the projection destination, and the shape of the projection destination. However, the present disclosure is not limited thereto, and the information display system 1 may use the LiDAR 505 for self-localization and SLAM for creating an environment map.

The wearer-image capturing camera 506 is a camera that captures an image of the user 2. The information display system 1 can use the image of the user 2 captured by the wearer-image capturing camera 506, for example, to estimate the direction of the line of sight of the user 2. The information display system 1 may use the image of the user 2 captured by the wearer-image capturing camera 506 to identify the user 2.

The one or more projectors 507 are image projection devices that project the image 4 onto the projection destination 3. The information display system 1 may include a plurality of projectors 507, for an exemplary case where it is desired to project the image 4 in a wide range, an exemplary case where it is desired to project the image 4 onto a plurality of projection destinations 3, or an exemplary case where it is desired to project the image 4 onto a projection destination 3 in a bright place. In the following description, it is assumed that the number of projectors 507 is one.

Wearable Terminal

Figure 6:
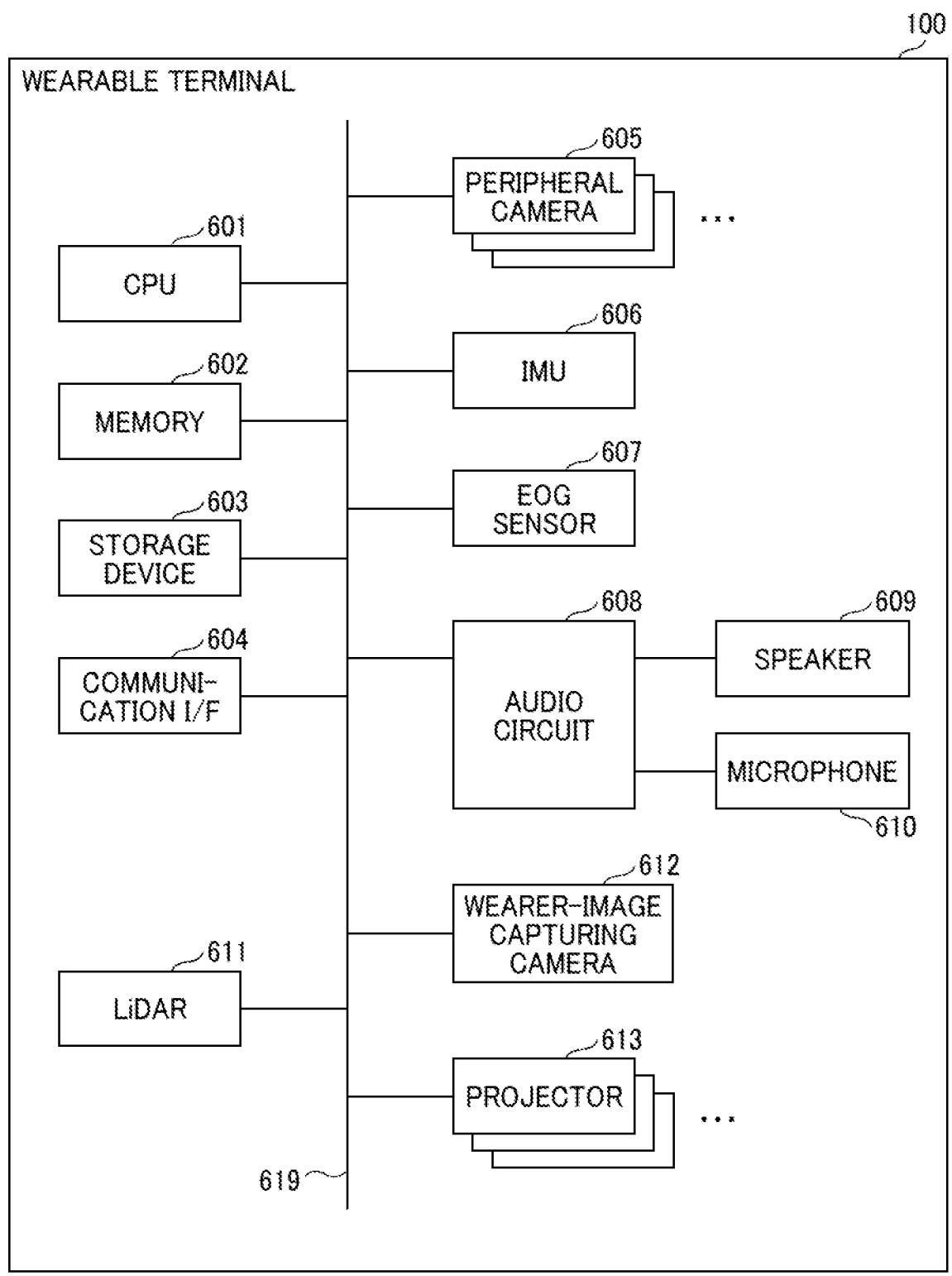
FIG. 6 is a block diagram illustrating an example of a hardware configuration of a wearable terminal according to the exemplary embodiment of the disclosure.

FIG. 6 is a block diagram illustrating an example of a hardware configuration of a wearable terminal according to the present embodiment.

The wearable terminal 100 includes, for example, a CPU 601, a memory 602, a storage device 603, a communication I/F 604, one or more peripheral cameras 605, a IMU 606, an EOG sensor 607, an audio circuit 608, a speaker 609, a microphone 610, and a bus 619.

The above-described components are substantially the same as the CPU 401, the memory 402, the storage device 403, the communication I/F 404, the one or more peripheral cameras 405, the IMU 406, the EOG sensor 407, the audio circuit 408, the speaker 409, the microphone 410, and the bus 411 described in FIG. 4, and thus description thereof is omitted.

The wearable terminal 100 includes, for example, a LiDAR 611, a wearer-image capturing camera 612, and one or more projectors 613. The above-described components are substantially the same as the LiDAR 505, the wearer-image capturing camera 506, and the one or more projectors 507 described in FIG. 5, and thus description thereof is omitted.

As illustrated in FIG. 6, the wearable terminal 100 has a configuration in which the first wearable terminal 100-1 and the second wearable terminal 100-2 are integrated.

Information Processing Apparatus

Figure 7:
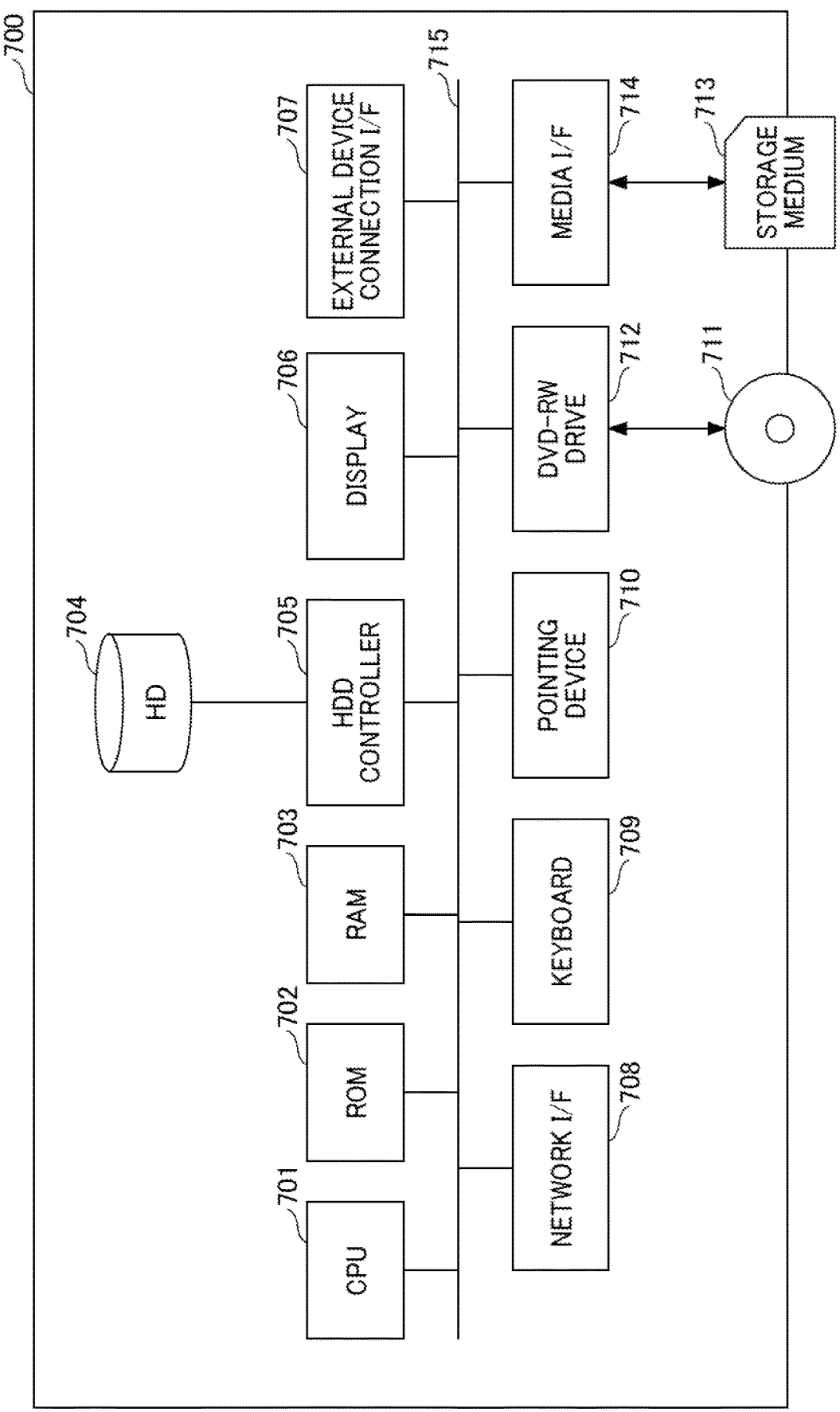
FIG. 7 is a block diagram illustrating an example of a hardware configuration of a computer according to the exemplary embodiment of the disclosure.

The information processing apparatus 300 has a hardware configuration of a computer 700 as illustrated in FIG. 7, for example. Alternatively, the information processing apparatus 300 is configured by a plurality of computers 700.

FIG. 7 is a block diagram illustrating an example of a hardware configuration of a computer according to the present embodiment. As illustrated in FIG. 7, the computer 700 includes, for example, a CPU 701, a ROM 702, a RAM 703, a hard disk (HD) 704, an HDD controller 705, a display 706, an external device connection I/F 707, a network I/F 708, a keyboard 709, a pointing device 710, a digital versatile disk rewritable (DVD-RW) drive 712, a media I/F 714, and a bus line 715.

The CPU 701 controls the entire operation of the computer 700. The ROM 702 stores a program such as an initial program loader (IPL) used for driving the computer 700. The RAM 703 is used as, for example, a work area for the CPU 701. The HD 704 stores, for example, programs including an operating system (OS), an application, and a device driver, and various data. The HDD controller 705 controls, for example, reading and writing of various data from and to the HD 704 under control of the CPU 701.

The display 706 displays various information such as a cursor, a menu, a window, a character, or an image. The display 706 may be provided outside the computer 700. The external device connection I/F 707 is an interface such as a universal serial bus (USB) for connecting various external devices to the computer 700. The network I/F 708 is, for example, an interface for communicating with another device using a communication network.

The keyboard 709 is one example of an input device provided with a plurality of keys that allows a user to input characters, numerals, or various instructions. The pointing device 710 is another example of an input device that allows a user to select or execute a specific instruction, select a target for processing, or move a cursor being displayed. The keyboard 709 and the pointing device 710 may be provided outside the computer 700. The DVD-RW drive 712 reads and writes various data from and to a DVD-RW 711, which is an example of a removable recording medium. The DVD-RW 711 is not limited to the DVD-RW and may be another recording medium.

The media I/F 714 controls reading or writing (storing) of data to a storage medium 713 such as a flash memory. The bus line 715 includes an address bus and a data bus. The bus line 715 electrically connects the above-described components to each other and transmits various control signals.

The hardware configuration of the computer 700 illustrated in FIG. 7 is an example. As long as the computer 700 includes, for example, the CPU 701, the ROM 702, the RAM 703, the network I/F 708, and the bus line 715, the other part of the configuration may be different.

Functional Configuration

FIGS. 8 to 12 are block diagrams each illustrating an example of a functional configuration of an information display system according to an embodiment.

Figure 8:
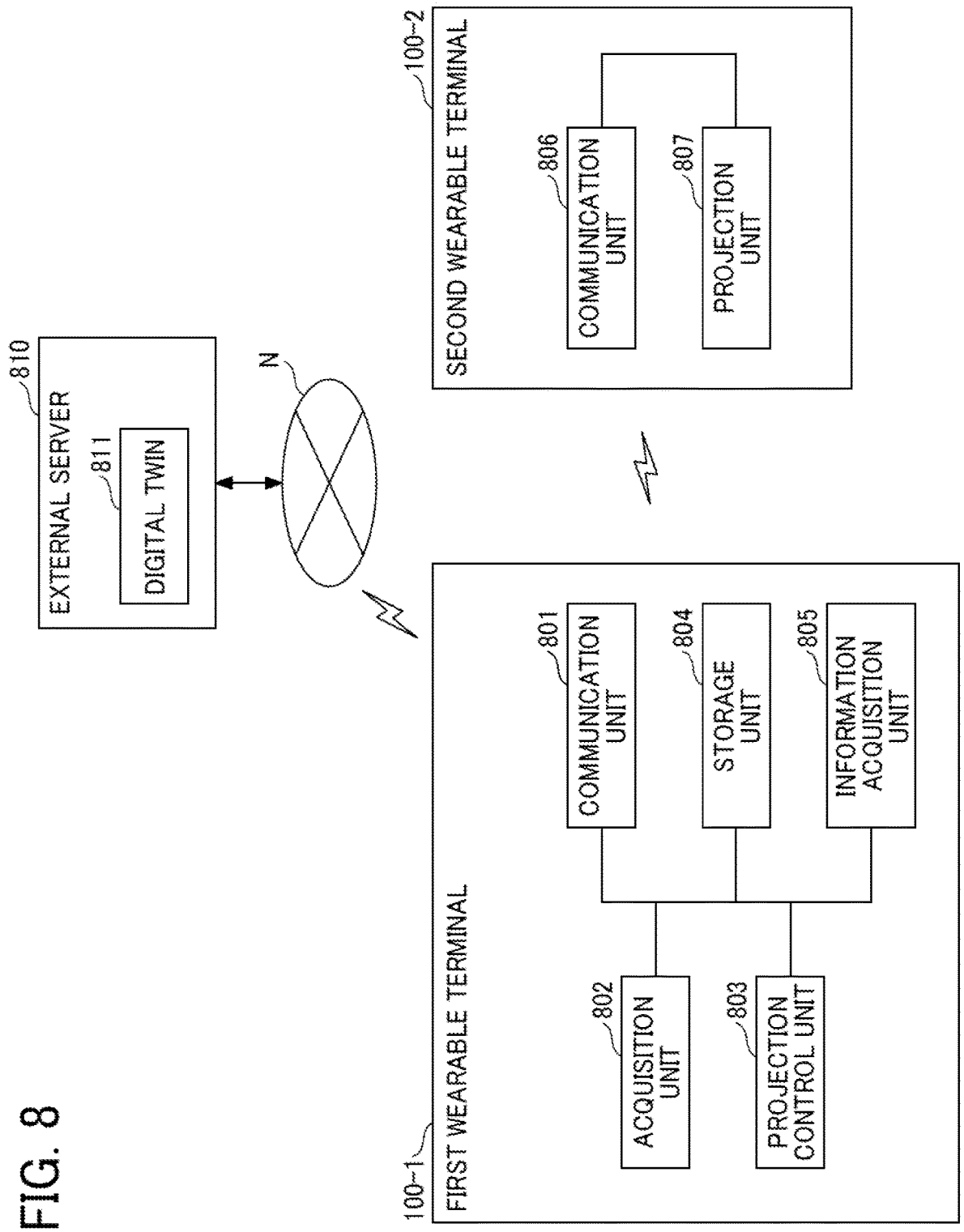
FIG. 8 is a block diagram illustrating an example of a functional configuration of the information display system according to the exemplary embodiment of the disclosure.

FIG. 8 is a block diagram illustrating an example of a functional configuration of a display system according to the present embodiment.

Functional Configuration of First Wearable Terminal

The first wearable terminal 100-1 includes a communication unit 801, an acquisition unit 802, a projection control unit 803, a storage unit 804, and an information acquisition unit 805 each of which is implemented by a predetermined program executed with the CPU 401 illustrated FIG. 4, for example. At least a part of the above-described functional units may be implemented by hardware.

The communication unit 801 executes communication processing for communicating with the second wearable terminal 100-2 using the communication I/F 404, for example. The communication unit 801 can also connect to a communication network N and communicate with an external device such as the external server 810 using the communication I/F 404.

The acquisition unit 802 executes acquisition processing for acquiring detection information including information on the posture of the user 2 (for example, information output from the IMU 406), information on the line of sight of the user 2 (for example, information detected by the EOG sensor 407), or the like. The acquisition unit 802 may acquire the information on the line of sight of the user 2 from the second wearable terminal 100-2.

The projection control unit 803 executes projection control processing for controlling the image 4 to be projected onto the projection destination 3 based on the detection information acquired by the acquisition unit 802 and information on the projection direction which is the direction of the projection destination 3 with respect to the user 2. A specific functional configuration and a processing detail of the projection control unit 803 are described later.

The storage unit 804 is implemented by, for example, a program executed by the CPU 401, the storage device 403, or the memory 402, and stores data for identifying the projection destination 3 and a plurality of threshold values, which is described later. The data for identifying the projection destination 3 may be, for example, three dimensional computer aided design (CAD) data of the projection destination 3 stored in advance, or three dimensional data of Digital Twin 811 acquired from the external server 810. The Digital Twin 811 is a technique for reproducing a copy (twin) of a physical space in a digital space based on three dimensional information acquired from the physical space. For example, the three dimensional data acquired from the Digital Twin 811 includes various kinds of information or data such as three dimensional data of various objects being in surroundings of the user 2, information on the position of the projection destination 3, and the image 4 to be projected onto the projection destination 3.

The data for identifying the projection destination 3 may be, for example, a machine learning model learned in advance so as to identify whether an object included in an image captured by the peripheral camera 405 is the projection destination 3 or not.

The information acquisition unit 805 executes information acquisition processing for acquiring information to be stored in the storage unit 804 (for example, three dimensional data of the Digital Twin 811, a learned machine learning model) from the external server 810 and storing the acquired information in the storage unit 804, as needed.

Functional Configuration of Second Wearable Terminal

The second wearable terminal 100-2 includes a communication unit 806 and a projection unit 807 each of which is implemented by a predetermined program executed with the CPU 501, for example. At least a part of the above-described functional units may be implemented by hardware.

The communication unit 806 executes communication processing for communicating with the first wearable terminal 100-1 using the communication I/F 504, for example. The communication unit 806 can also connect to the communication network N and communicate with an external device such as the external server 810 using the communication I/F 504.

The projection unit 807 performs projection processing for projecting the image 4 onto the projection destination 3 using the projector 507 according to the instruction from the projection control unit 803.

The functional configuration of the information display system 1 illustrated in FIG. 8 is an example. For example, each functional unit of the first wearable terminal 100-1 and each functional unit of the second wearable terminal 100-2 in FIG. 8 may be provided in any device as long as being included in the information display system 1.

Figure 9:
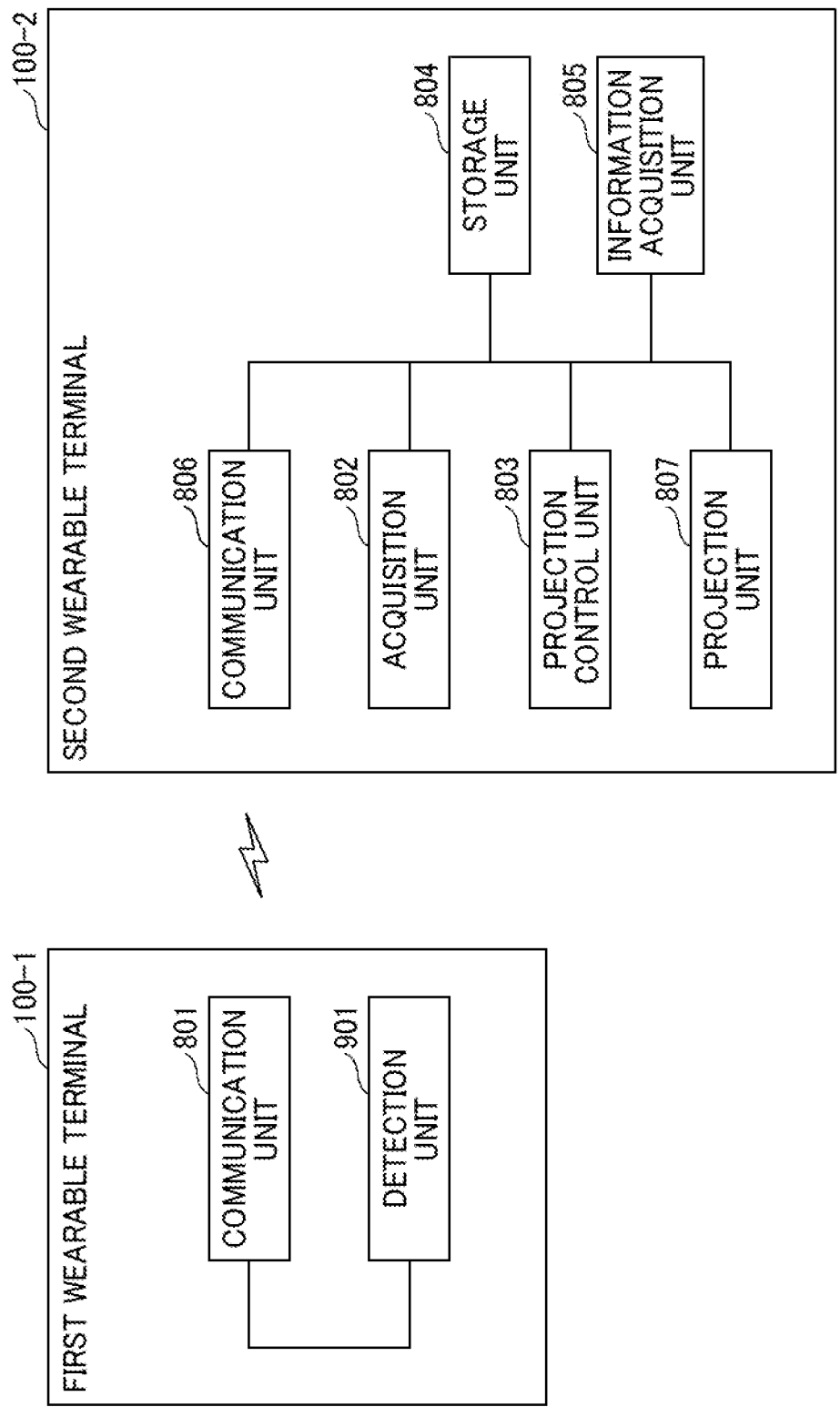
FIG. 9 is a block diagram illustrating another example of a functional configuration of the information display system according to the exemplary embodiment of the disclosure.

FIG. 9 is a block diagram illustrating another example of the functional configuration of the information display system 1 according to the present embodiment. As illustrated in FIG. 9, the functional configuration such as the acquisition unit 802, the projection control unit 803, the storage unit 804, and the information acquisition unit 805 may be included in the second wearable terminal 100-2. In this case, each of the acquisition unit 802, the projection control unit 803, the storage unit 804, and the information acquisition unit 805 is implemented by a predetermined program executed with the CPU 501 illustrated FIG. 5, for example. In addition, the storage unit 804 is implemented by, for example, a program executed by the CPU 501, the storage device 503, or the memory 502, and stores data for identifying the projection destination 3 and a plurality of threshold values, which is described later. In this case, the acquisition unit 802 acquires the detection information including the information on the posture of the user 2 or the information on the line of sight of the user 2 from the first wearable terminal 100-1.

In this case, the first wearable terminal 100-1 includes a detection unit 901. The detection unit 901 is implemented by, for example, a program executed with the CPU 401, acquires the detection information from the IMU 406 or the EOG sensor 407, and transmits the acquired detection information to the second wearable terminal 100-2 via the communication unit 801. Functional units other than the above-described functional units may be substantially the same as the functional units described with reference to FIG. 8.

Figure 10:
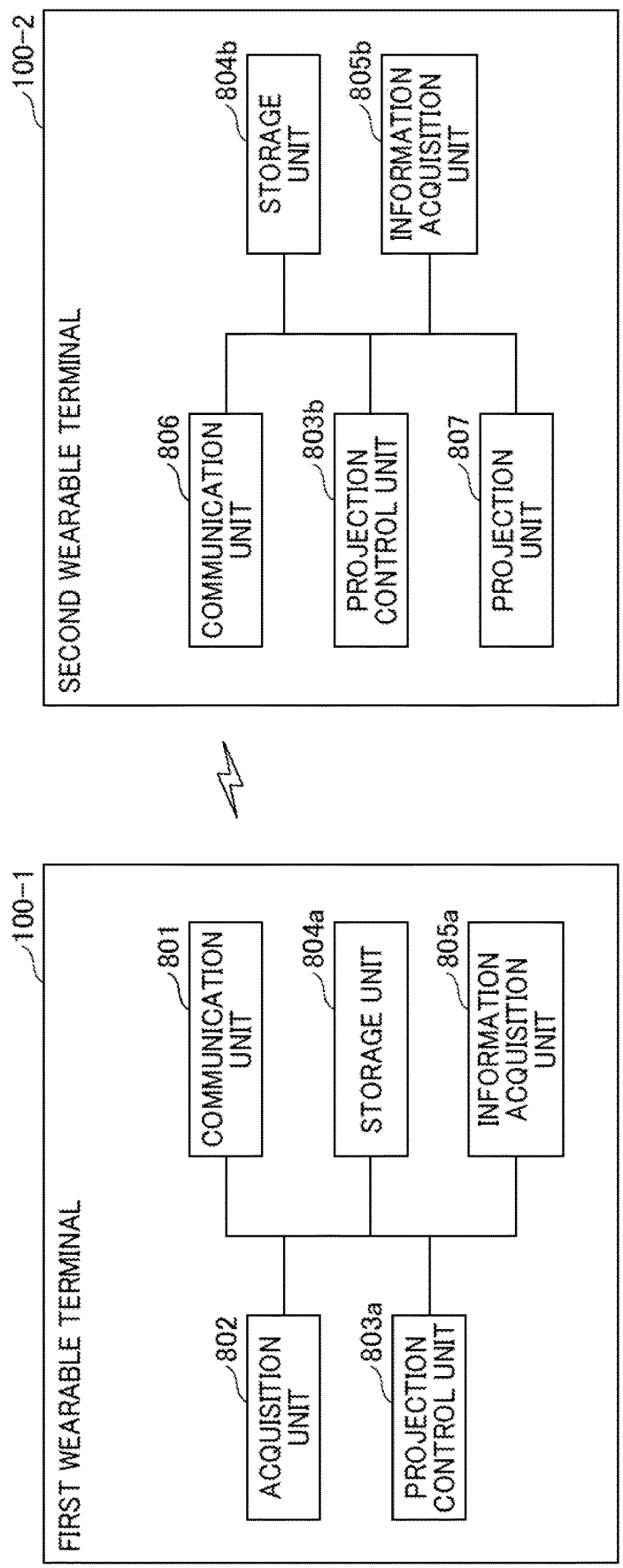
FIG. 10 is a block diagram illustrating still another example of a functional configuration of the information display system according to the exemplary embodiment of the disclosure.

FIG. 10 is a block diagram illustrating still another example of the functional configuration of the information display system 1 according to the present embodiment.

As illustrated in FIG. 10, each of the projection control unit 803, the storage unit 804, and the information acquisition unit 805 may be distributed to be provided to the first wearable terminal 100-1 and the second wearable terminal 100-2.

In the example of FIG. 10, a projection control unit 803*a* included in the first wearable terminal 100-1 implements the function of the projection control unit 803 described in FIG. 8 by cooperating with a projection control unit 803*b* included in the second wearable terminal 100-2. A storage unit 804*a* included in the first wearable terminal 100-1 stores information used by the projection control unit 803*a* among the information stored in the storage unit 804 described with reference to FIG. 8, and an information acquisition unit 805*a* acquires the information stored in the storage unit 804*a* as appropriate.

Similarly, the projection control unit 803*b* included in the second wearable terminal 100-2 implements the function of the projection control unit 803 described in FIG. 8 by cooperating with the projection control unit 803*a* included in the first wearable terminal 100-1. The storage unit 804*b* included in the second wearable terminal 100-2 stores information used by the projection control unit 803*b* among the information stored in the storage unit 804 described with reference to FIG. 8, and an information acquisition unit 805*b* acquires the information stored in the storage unit 804*b* as appropriate.

Figure 11:
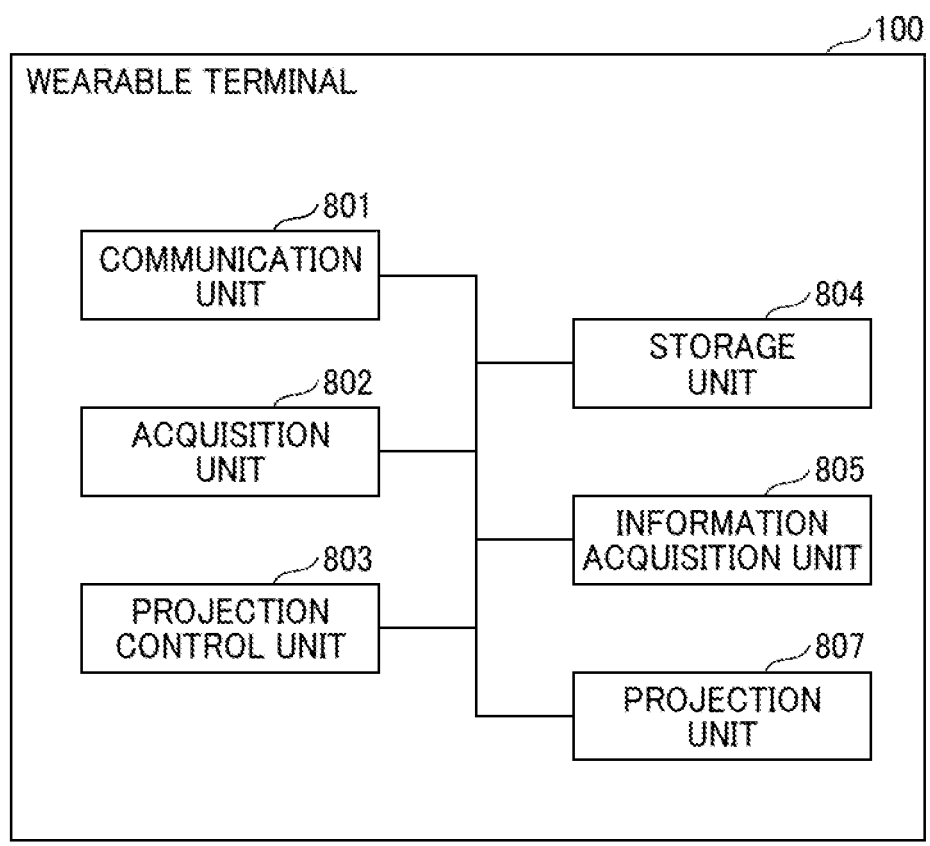
FIG. 11 is a block diagram illustrating still another example of a functional configuration of the information display system according to the exemplary embodiment of the disclosure.

FIG. 11 is a block diagram illustrating still another example of the functional configuration of the information display system 1 according to the present embodiment.

As illustrated in FIG. 11, each functional unit included in the information display system 1 may be implemented by the wearable terminal 100 in which the functions of the first wearable terminal 100-1 and the second wearable terminal 100-2 are integrated. In the example of FIG. 11, the wearable terminal 100 includes the communication unit 801, the acquisition unit 802, the projection control unit 803, the storage unit 804, the information acquisition unit 805, and the projection unit 807 each of which is implemented by a predetermined program executed with the CPU 601, for example. In addition, the storage unit 804 is implemented by, for example, a program executed by the CPU 601, the storage device 603, or the memory 602, and stores data for identifying the projection destination 3 and a plurality of threshold values, which is described later. The functional units described above are substantially the same as the communication unit 801, the acquisition unit 802, the projection control unit 803, the storage unit 804, the information acquisition unit 805, and the projection unit 807 described with reference to FIG. 8, and thus description thereof is omitted.

Figure 12:
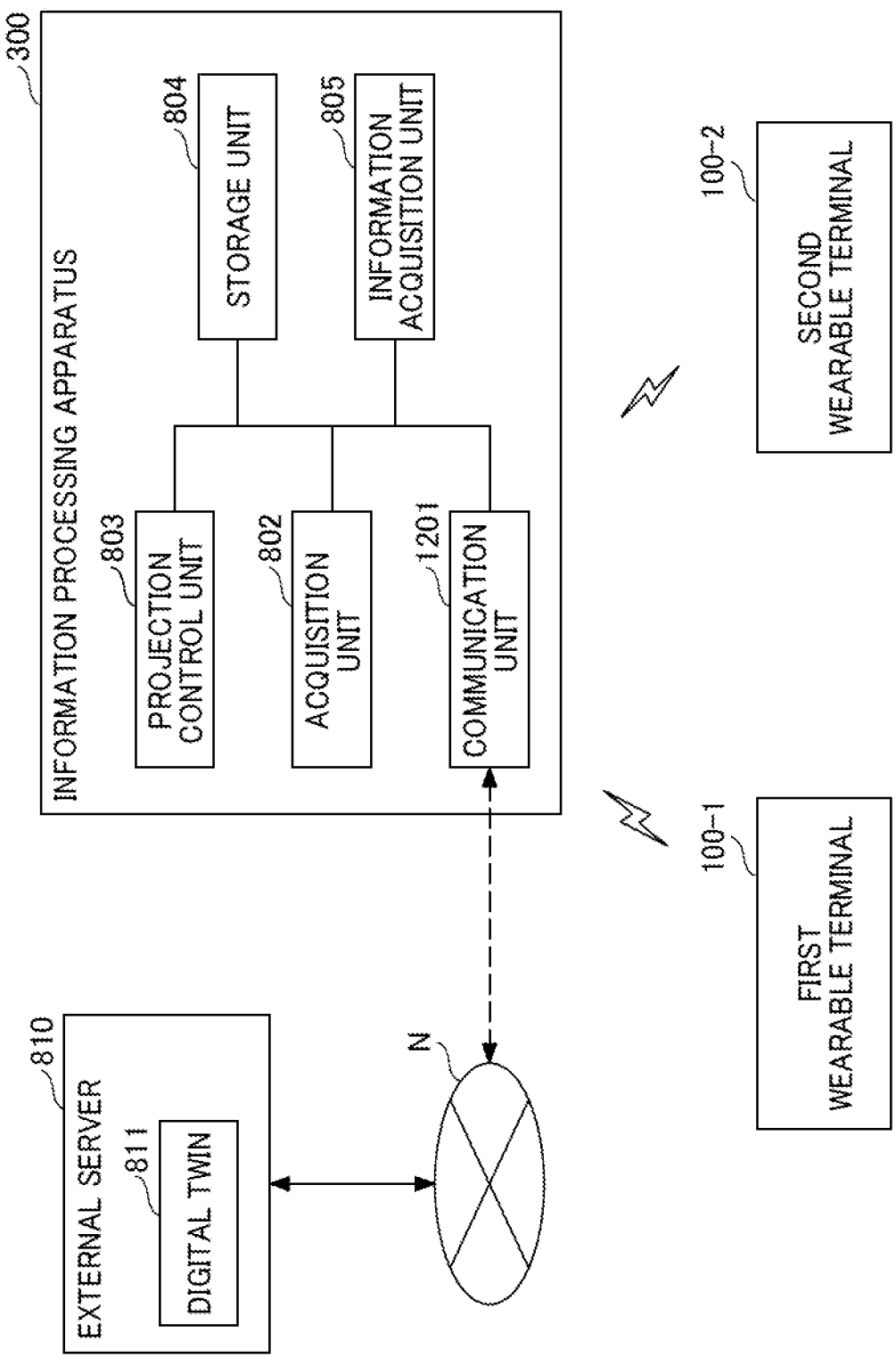
FIG. 12 is a block diagram illustrating still another example of a functional configuration of the information display system according to the exemplary embodiment of the disclosure.

FIG. 12 is a block diagram illustrating still another example of the functional configuration of the information display system 1 according to the present embodiment.

As illustrated in FIG. 12, among the functional units included in the information display system 1, the acquisition unit 802, the projection control unit 803, the storage unit 804, and the information acquisition unit 805 may be included in the information processing apparatus 300.

In the example of FIG. 12, the information processing apparatus 300 includes a communication unit 1201, the acquisition unit 802, the projection control unit 803, the storage unit 804, and the information acquisition unit 805 each of which is implemented by a predetermined program executed with the CPU 701. In addition, the storage unit 804 is implemented by, for example, a program executed by the CPU 701, the HD 704, or the ROM 702, and stores data for identifying the projection destination 3 and a plurality of threshold values, which is described later. The acquisition unit 802, the projection control unit 803, the storage unit 804, and the information acquisition unit 805 are the same as the acquisition unit 802, the projection control unit 803, the storage unit 804, and the information acquisition unit 805 described in FIG. 8, and thus description thereof is omitted.

The communication unit 1201 executes communication processing for communicating with the first wearable terminal 100-1 and the second wearable terminal 100-2 using the network I/F 708, for example. The communication unit 1201 connects the information processing apparatus 300 to the communication network N and can also communicate with the external server 810, for example.

In the example of FIG. 12, the first wearable terminal 100-1 has the functional configuration of the first wearable terminal 100-1 as illustrated in FIG. 9 as an example. As another example, the first wearable terminal 100-1 may have the functional configuration of the first wearable terminal 100-1 as illustrated in FIG. 10.

As an example, the second wearable terminal 100-2 has the functional configuration of the second wearable terminal 100-2 as illustrated in FIG. 8. As another example, the second wearable terminal 100-2 may have the functional configuration of the second wearable terminal 100-2 as illustrated in FIG. 10.

In a case where the first wearable terminal 100-1 has the functional configuration of the first wearable terminal 100-1 as illustrated in FIG. 10, the projection control unit 803, the storage unit 804, and the information acquisition unit 805 of the information processing apparatus 300 implement functions described with reference to FIG. 8 by cooperating with the first wearable terminal 100-1. In a case where the second wearable terminal 100-2 has the functional configuration of the second wearable terminal 100-2 as illustrated in FIG. 10, the projection control unit 803, the storage unit 804, and the information acquisition unit 805 of the information processing apparatus 300 implement functions described with reference to FIG. 8 by cooperating with the second wearable terminal 100-2.

In addition, when the first wearable terminal 100-1 and the second wearable terminal 100-2 have the functional configuration as illustrated in FIG. 10, the information processing apparatus 300 implements each function by cooperating with the first wearable terminal 100-1 and the second wearable terminal 100-2.

As described above, each functional unit included in the first wearable terminal 100-1 and the second wearable terminal 100-2 described in FIG. 8 may be included any device as long as being included in the information display system 1.

Functional Configuration of Projection Control Unit

Figure 13:
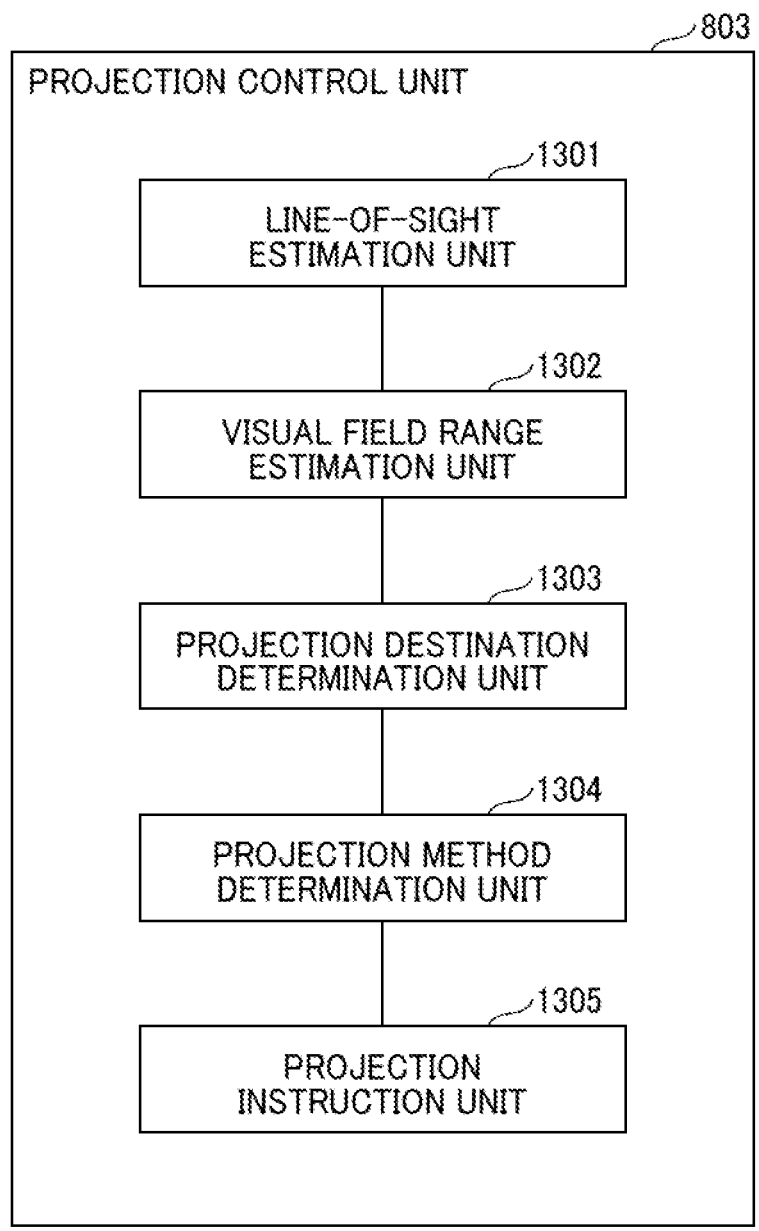
FIG. 13 is a block diagram illustrating an example of a functional configuration of a projection control unit according to the exemplary embodiment of the disclosure.

FIG. 13 is a block diagram illustrating an example of a functional configuration of a projection control unit according to the present embodiment. As illustrated in FIG. 13, the projection control unit 803 includes, for example, a line-of-sight estimation unit 1301, a visual field range estimation unit 1302, a projection destination determination unit 1303, a projection method determination unit 1304, and a projection instruction unit 1305.

The line-of-sight estimation unit 1301 executes line-of-sight estimation processing for estimating a direction of the line of sight of the user 2 based on the detection information acquired by the acquisition unit 802. For example, the line-of-sight estimation unit 1301 may acquire the direction of the line of sight of the user 2 from the detection information acquired from the EOG sensor 407 that acquires a direction of a line of sight. In addition, the line-of-sight estimation unit 1301 may measure which direction the face facing based on the detection information acquired from the IMU 406 and estimate the direction of the line of sight of the user 2 based on the measured direction. The line-of-sight estimation unit 1301 may further analyze an image of the user 2 captured by the wearer-image capturing camera 506 and estimate the direction of the line of sight of the user 2.

The visual field range estimation unit 1302 estimates a visual field range of the user 2 extending from the direction of the line of sight of the user 2 estimated by the line-of-sight estimation unit 1301.

As an example, the projection destination determination unit 1303 determines (identifies) the projection destination 3 around the user 2 based on the image corresponding to surroundings of the user 2 captured by the peripheral camera 605 and the information (for example, three dimensional CAD data) on the projection destination 3 stored in advance in the storage unit 804.

As another example, the projection destination determination unit 1303 may determine the projection destination by acquiring three dimensional information on the surroundings of the user 2 from the image captured by the peripheral camera 605 by visual SLAM (VSLAM) and comparing the acquired three dimensional information with the three dimensional information acquired from the Digital Twin 811. The three dimensional data acquired from the Digital Twin 811 includes at least information indicating the position of the projection destination 3 and information on the image 4 to be projected onto the projection destination 3.

The projection method determination unit 1304 changes a projection method (for example, content, position, highlighting) for the image 4 to be projected onto the projection destination 3 based on a difference between the direction of the line of sight of the user 2 estimated by the line-of-sight estimation unit 1301 and the direction (projection direction) of the projection destination 3 with respect to the user.

The projection instruction unit 1305 executes projection instruction processing for instructing projection of the image 4 onto the projection destination 3 by the projection method determined by the projection method determination unit 1304.

Process

A process of displaying information according to the present embodiment is described below.

Process Performed by Information Display System FIG. 14 is a flowchart illustrating an example of a process performed by an information display system according to the present embodiment.

The process illustrated in FIG. 14 is an example performed by the information display system 1 having any one of the functional configurations illustrated in FIGS. 8 to 13.

In step S1401, the acquisition unit 802 acquires detection information including information on the posture of the user 2 and information on the line of sight of the user 2. The information on the posture of the user 2 includes, for example, three dimensional angular velocities and accelerations detected by the IMU 406. In addition, the information on the line of sight of the user includes, for example, data indicating the direction of the line of sight of the user 2 detected by the EOG sensor 407 or a captured image of the user 2 captured by the wearer-image capturing camera 506.

In step S1402, the projection control unit 803 estimates the direction of the line of sight of the user 2 based on the detection information acquired by the acquisition unit 802. For example, the line-of-sight estimation unit 1301 of the projection control unit 803 acquires the direction of the line of sight of the user 2 based on the detection information acquired from the EOG sensor 407.

Figure 15B:
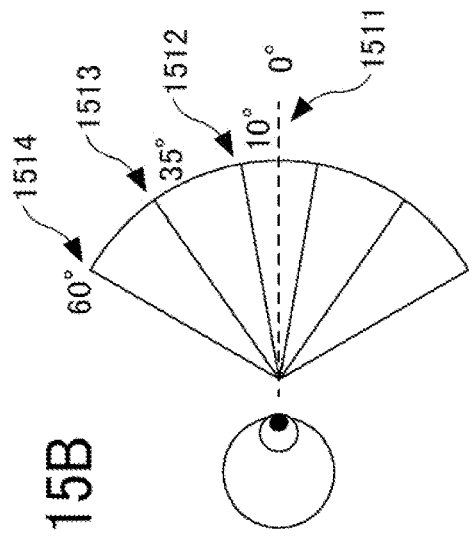
FIGS. 15A to 15C are diagrams for describing a visual field range according to the exemplary embodiment of the disclosure.
Figure 15C:
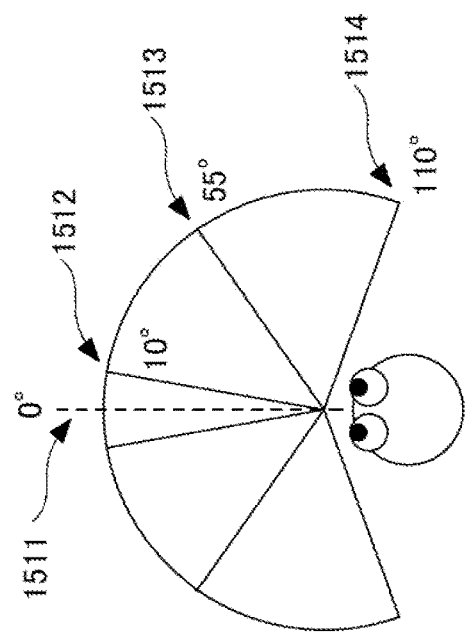
Figure 15A:
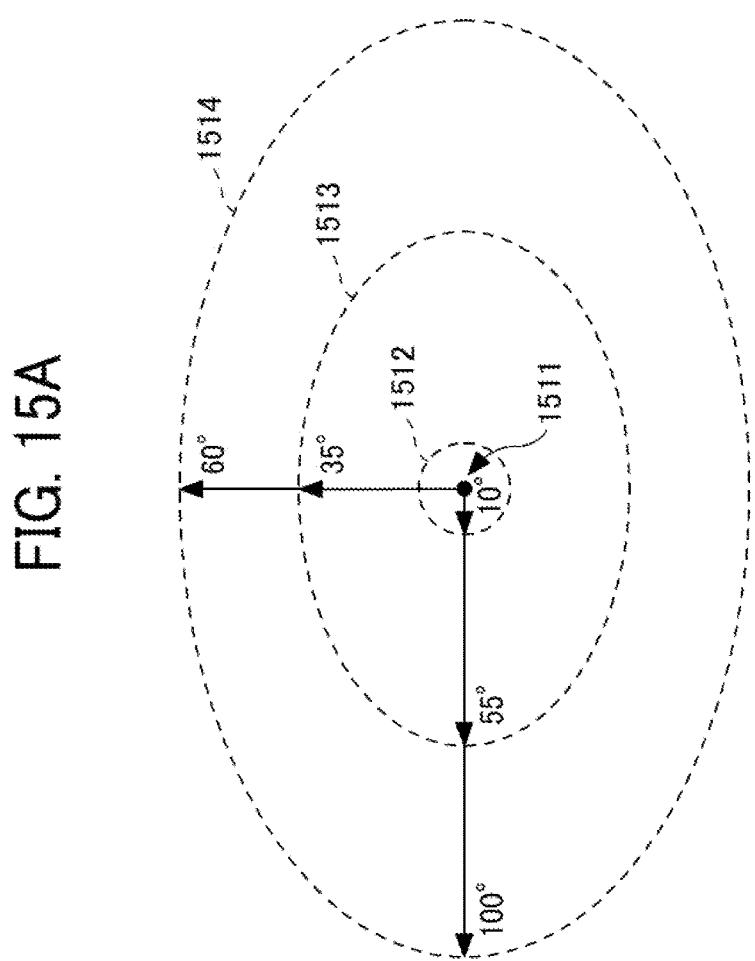

In step S1403, the projection control unit 803 estimates the visual field range of the user 2. FIGS. 15A to 15C are diagrams for describing a visual field range according to the present embodiment. For example, as illustrated in FIGS. 15A to 15C, regarding the visual field of human, the entire visual field spreads around a direction of a line of sight 1511 of the person as a center. The visual field is mainly divided into three ranges.

A first range is an effective visual field 1512 that is a range of ±10 degrees in the vertical direction and ±10 degrees in the horizontal direction with respect to the direction of the line of sight 1511 as illustrated in FIGS. 15B and 15C, for example. A second range is a stable visual field 1513 that is a range of ±10 degrees or more and less than 35 degrees in the vertical direction and ±10 degrees or more and less than 55 degrees in the horizontal direction with respect to the direction of the line of sight 1511 as illustrated in FIGS. 15B and 15C, for example. A third range is a peripheral visual field 1514 that is a range of ±35 degrees or more and 60 degrees or less in the vertical direction and a range of 55 degrees or more and less than 110 degrees in the horizontal direction with respect to the direction of the line of sight 1511 as illustrated in FIGS. 15B and 15C, for example.

The effective visual field 1512 is a range closest to a direction to which a person pays close attention with his or her line of sight, and information displayed in this range is easily noticed. A state of paying close attention to refers to, for example, a state in which the line of sight is directed one point or a narrow range in a space for a certain period of time or more.

The farer the line of sight is, for example, from the effective visual field 1512 to the stable visual field 1513 or from the stable visual field 1513 to the peripheral visual field 1514, the harder a person consciously sees and the harder the person notices information displayed in the range.

As described above, capability of the visual field of human varies depending on a range. Accordingly, dividing a visual field of a person into a plurality of regions according to the direction from the line of sight and changing a display method for each region allows the person to notice information that has a great distance from the direction of the line of sight. The number of ranges into which the visual field of the person is divided may be any number, and the projection method may be gradually changed in accordance with the distance.

In the following description of an example, the visual field range estimation unit 1302 of the projection control unit 803 estimates three ranges of the effective visual field 1512, the stable visual field 1513, and the peripheral visual field 1514 for the user 2 in step S1403.

In step S1404, the projection control unit 803 determines the position of a projection destination 3. For example, the projection destination determination unit 1303 of the projection control unit 803 may determine the position of the projection destination 3 by a known template matching technique using three dimensional data of the projection destination 3 stored in advance in the storage unit 804 from an image of surroundings of the user 2 captured by a peripheral camera.

Alternatively, the projection destination determination unit 1303 may perform self-localization and environment map creation by SLAM based on a captured image captured by a peripheral camera or three dimensional data acquired by LiDAR, and determine the position of the projection destination 3 in association with the data of the Digital Twin 811.

In step S1405, the projection control unit 803 determines a projection method for an image. For example, the projection method determination unit 1304 of the projection control unit 803 changes the projection method for the image to be projected onto the projection destination 3 based on the difference between the direction of the line of sight 1511 of the user 2 and the direction of the projection destination 3 with respect to the direction of the line of sight 1511. Determining the projection method determination method by the projection method determination unit 1304 is described later with a plurality of exemplary embodiments.

In step S1406, the projection control unit 803 projects the image by the determined projection method. For example, the projection instruction unit 1305 of the projection control unit 803 identifies a projection direction in which an object is present by the image captured by the peripheral camera or the SLAM based on the three dimensional data acquired by the LiDAR, and instructs the projection unit 807 to project the image in the identified projection direction.

Projection Method Determination Process

First Embodiment

FIG. 16 is a flowchart illustrating an example of a process of determining a projection method according to a first embodiment. The process is an example of a process executed by the projection method determination unit 1304 of the projection control unit 803 in step S1405 of FIG. 14.

In step S1601, the projection method determination unit 1304 calculates to obtain a difference X between the direction of the line of sight of the user 2 and the projection direction in which the object is present.

In step S1602, the projection method determination unit 1304 determines whether the obtained X is equal to or less than a first threshold value. In the following, a description of an example is given in which a range in which the X is equal to or less than the first threshold is a range corresponding to the effective visual field 1512 described in FIGS. 15A to 15C.

When X is equal to or less than the first threshold value, the process performed by the projection method determination unit 1304 proceeds to step S1603. On the other hand, when X is not equal to or less than the first threshold value, the process performed by the projection method determination unit 1304 proceeds to step S1604.

When the process proceeds to step S1603, the projection method determination unit 1304 determines to project the image onto the object by a normal display method. The normal display method indicates that an image is displayed as it is without performing highlighting, which is described later.

FIG. 17 is a diagram illustrating an example of a normal display method according to the first embodiment. As illustrated in FIG. 17, when the projection destination 1700 is within the effective visual field 1512 (when X is equal to or less than the first threshold value), the information display system 1 projects an image 1701 onto a projection destination 1700 as it is. In the example of FIG. 17, the image 1701 to be projected onto the projection destination 1700 is an image representing a character string "Check Here."

When the process proceeds from step S1602 to step S1604, the projection method determination unit 1304 determines whether the obtained X is equal to or less than a second threshold value. In the following, a description of an example is given in which a range in which the X is equal to or less than the second threshold is a range corresponding to the stable visual field 1513 described in FIGS. 15A to 15C.

When X is equal to or less than the second threshold value, the process performed by the projection method determination unit 1304 proceeds to step S1605. On the other hand, when X is not equal to or less than the first threshold value, the process performed by the projection method determination unit 1304 proceeds to step S1606.

When the process proceeds to step S1605, the projection method determination unit 1304 determines to project the image onto the object by a first highlighting. The first highlighting indicates a first step of highlighting of an image to be projected in order to attract the eyes of the user 2, and includes blinking display, enlarged display, determination display, and movement display.

Figure 18:
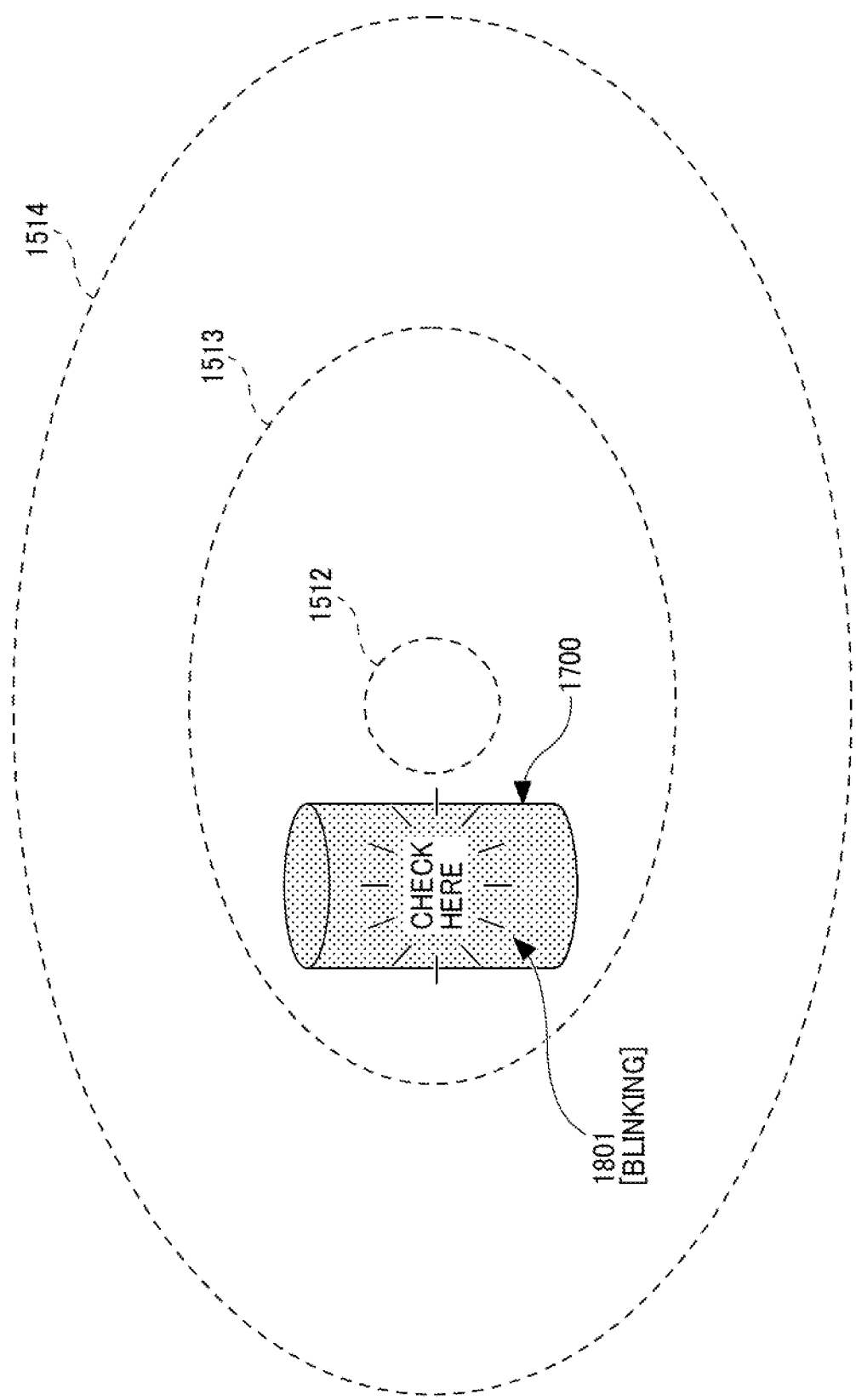
FIG. 18 is a diagram illustrating an example of first highlighting according to the first embodiment of the disclosure.

FIG. 18 is a diagram illustrating an example of first highlighting according to the first embodiment. As illustrated in FIG. 18, when the projection destination 1700 is within the stable visual field 1513 (when the X is greater than the first threshold value and equal to or less than the second threshold value), the information display system 1 may project onto the projection destination 1700 an image 1801 in a blinking manner (an example of the first highlighting). Accordingly, when the projection destination 1700 is present in the stable visual field 1513, the information display system 1 can highlight and project the image 1801 so that the line of sight of the user 2 is directed to the projection destination 1700.

When the process proceeds from step S1604 to step S1606, the projection method determination unit 1304 determines to project the image onto the object by the second highlighting. The second highlighting indicates a second step of highlighting of an image to be projected in order to further attract the eyes of the user 2, and includes blinking display, enlarged display, determination display, and movement display. However, the present disclosure is not limited to this, and the second highlighting may be performed by any display method as long as it is more highlighted or more noticeable than the first highlighting.

Figure 19:
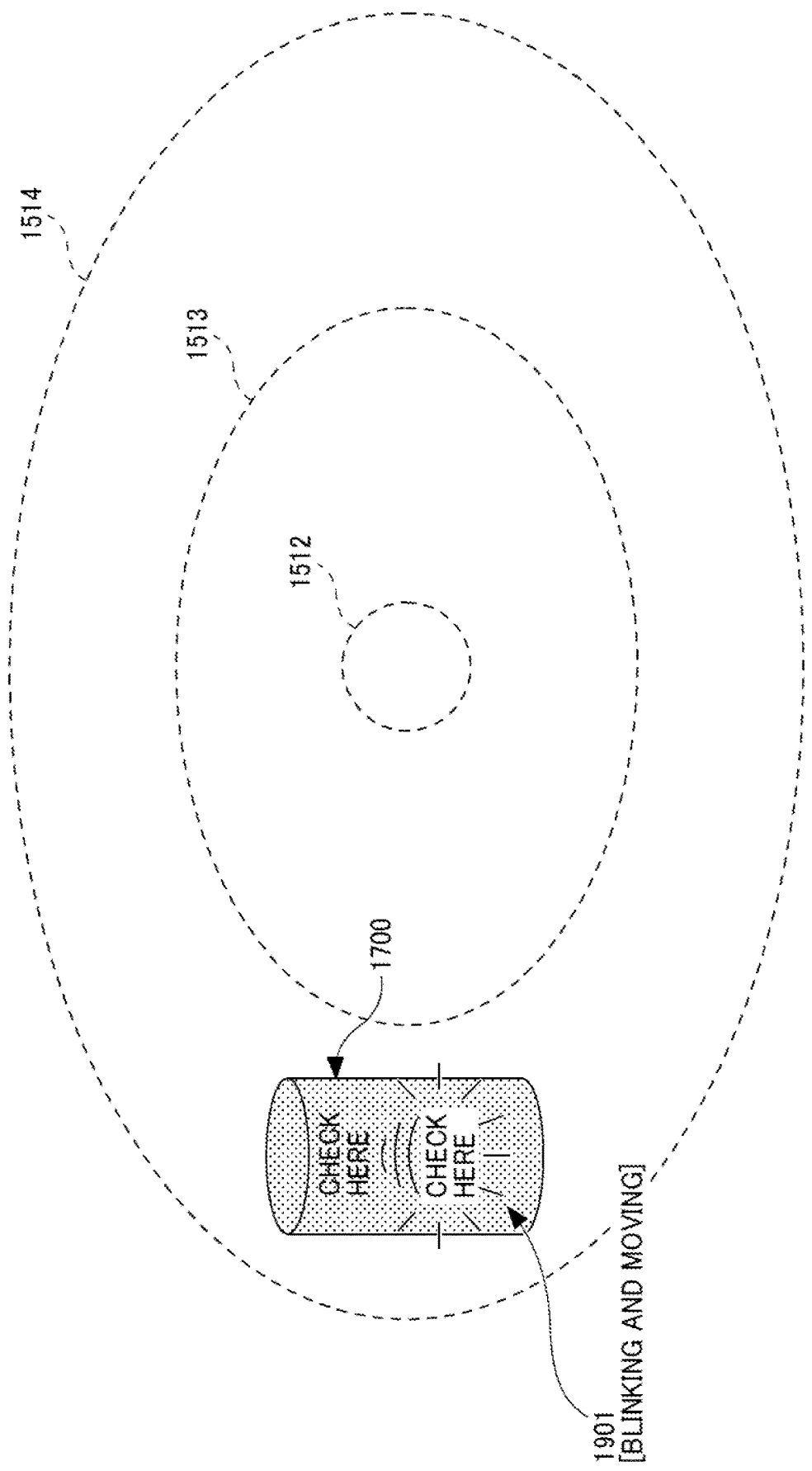
FIG. 19 is a diagram illustrating an example of second highlighting according to the first embodiment of the disclosure.

FIG. 19 is a diagram illustrating an example of second highlighting according to the first embodiment. As illustrated in FIG. 19, when the projection destination 1700 is outside the stable visual field 1513 (when the X is greater than the second threshold value), the information display system 1 may project onto the projection destination 1700 an image 1901 in a blinking and moving manner (an example of the second highlighting). Accordingly, when the projection destination 1700 is outside the stable visual field 1513, the information display system 1 can further highlight and project the image 1801 so that the line of sight of the user 2 is further directed to the projection destination 1700.

Second Embodiment

Figure 20:
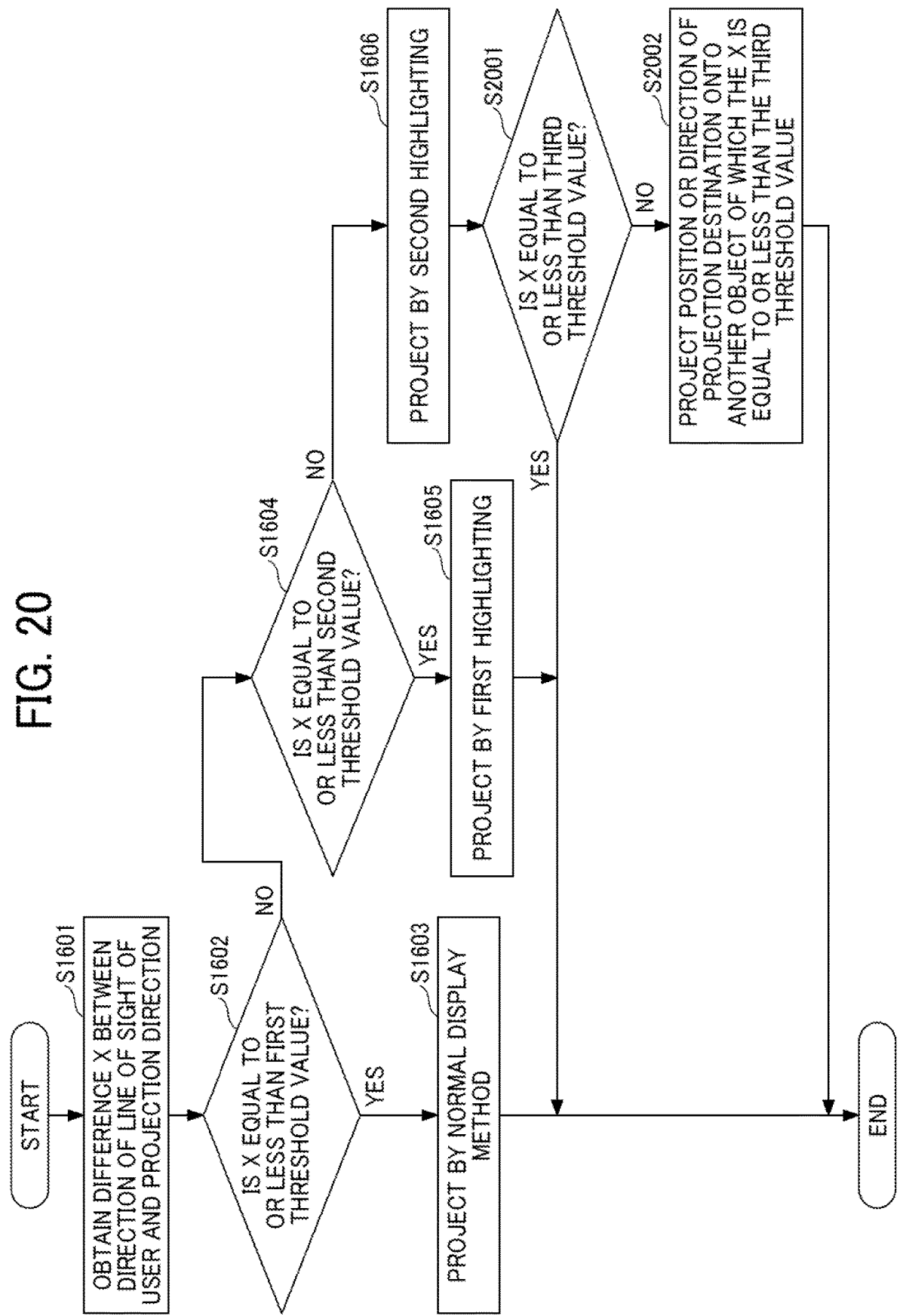
FIG. 20 is a flowchart illustrating an example of a process of determining a projection method according to a second embodiment of the disclosure.

FIG. 20 is a flowchart illustrating an example of a process of determining a projection method according to a second embodiment. The process is another example of a process executed by the projection method determination unit 1304 of the projection control unit 803 in step S1405 of FIG. 14. Among the steps illustrated in FIG. 20, the processing of steps S1601 to S1606 are substantially the same as the processing of the steps of the same step numerals in FIG. 6. Accordingly, a redundant description thereof is omitted below.

When the projection method determination unit 1304 determines in step S1606 that the image is to be projected onto the object by the second highlighting, the projection method determination unit 1304 determines in step S2001 whether the X is equal to or less than a third threshold value or not.

When the X is equal to or less than the third threshold value, the projection method determination unit 1304 ends the process of FIG. 20. On the other hand, when the X is not equal to or less than the third threshold value, the process performed by the projection method determination unit 1304 proceeds to step S2002.

When the process proceeds to step S2002, the projection method determination unit 1304 determines that the image indicating the position or the direction of the projection destination is to be projected onto another object of which the X is equal to or less than the third threshold value.

Figure 21:
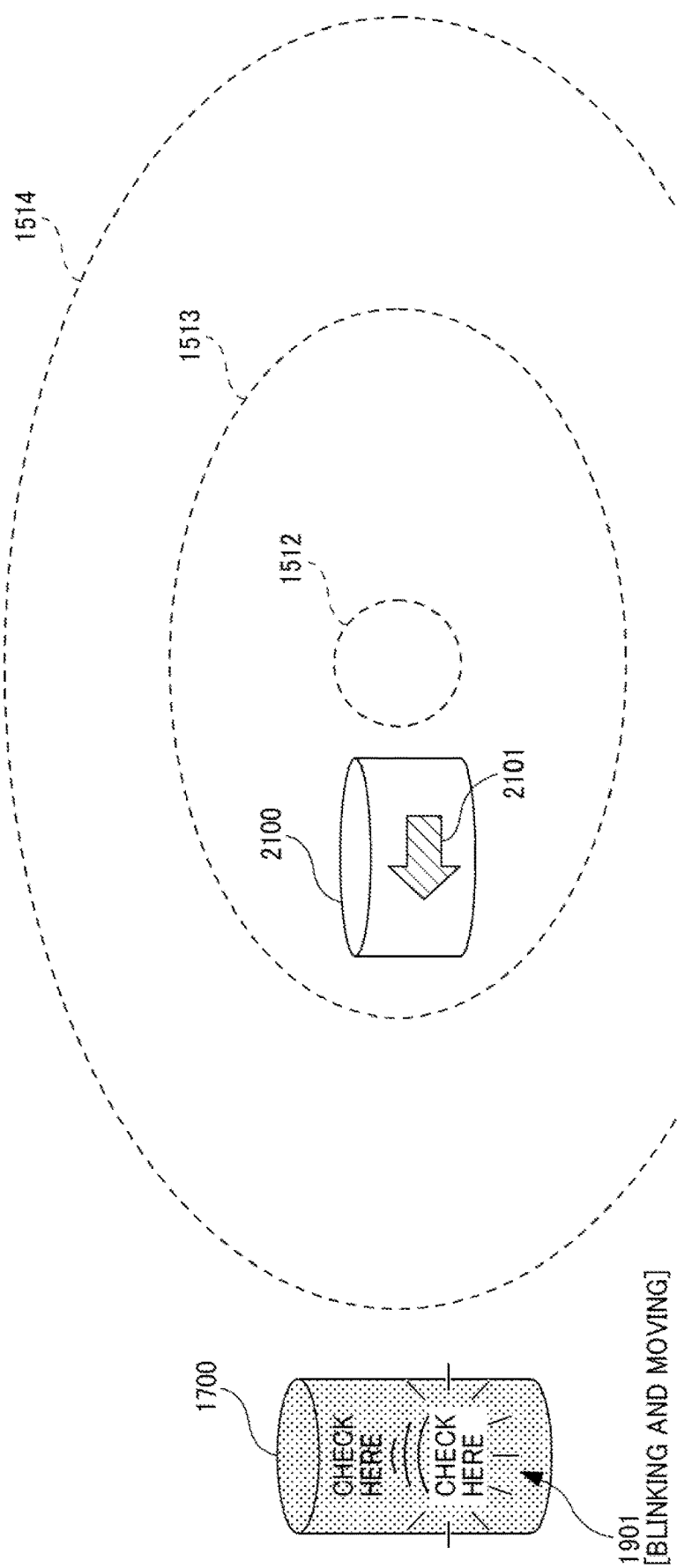
FIG. 21 is a diagram illustrating an example of a display method according to the second embodiment of the disclosure.

FIG. 21 is a diagram illustrating an example of a display method according to the second embodiment. In the example of FIG. 21, the projection destination 1700 is outside the peripheral visual field 1514 of the user 2 (an example of the third threshold value). In such a case, the projection method determination unit 1304 determines to project an image indicating the position or the direction of the projection destination 1700 onto another projection destination 2100 in the peripheral visual field 1514 of the user 2. In the example of FIG. 21, an image including an arrow (an example of a display component) 2101 indicating the direction of the projection destination 2100 is projected onto the other projection destination 1700.

Preferably, even when the projection destination 1700 is outside the peripheral visual field 514 of the user 2, the information display system 1 projects onto the projection destination 1700 the image 1901 in a blinking and moving manner (second highlighting). Accordingly, when the user 2 moves his or her line of sight, the projection destination 1700 and the image 1901 can be visually recognized easily. The third threshold value is not limited to the peripheral visual field 1514, and may be changeable by a setting value, for example.

Third Embodiment

According to a third embodiment, the information display system 1 acquires information on a line-of-sight velocity of the user 2 and changes a threshold value (for example, the first threshold, the second threshold, or the third threshold) based on the acquired information on the line-of-sight velocity.

Figure 22:
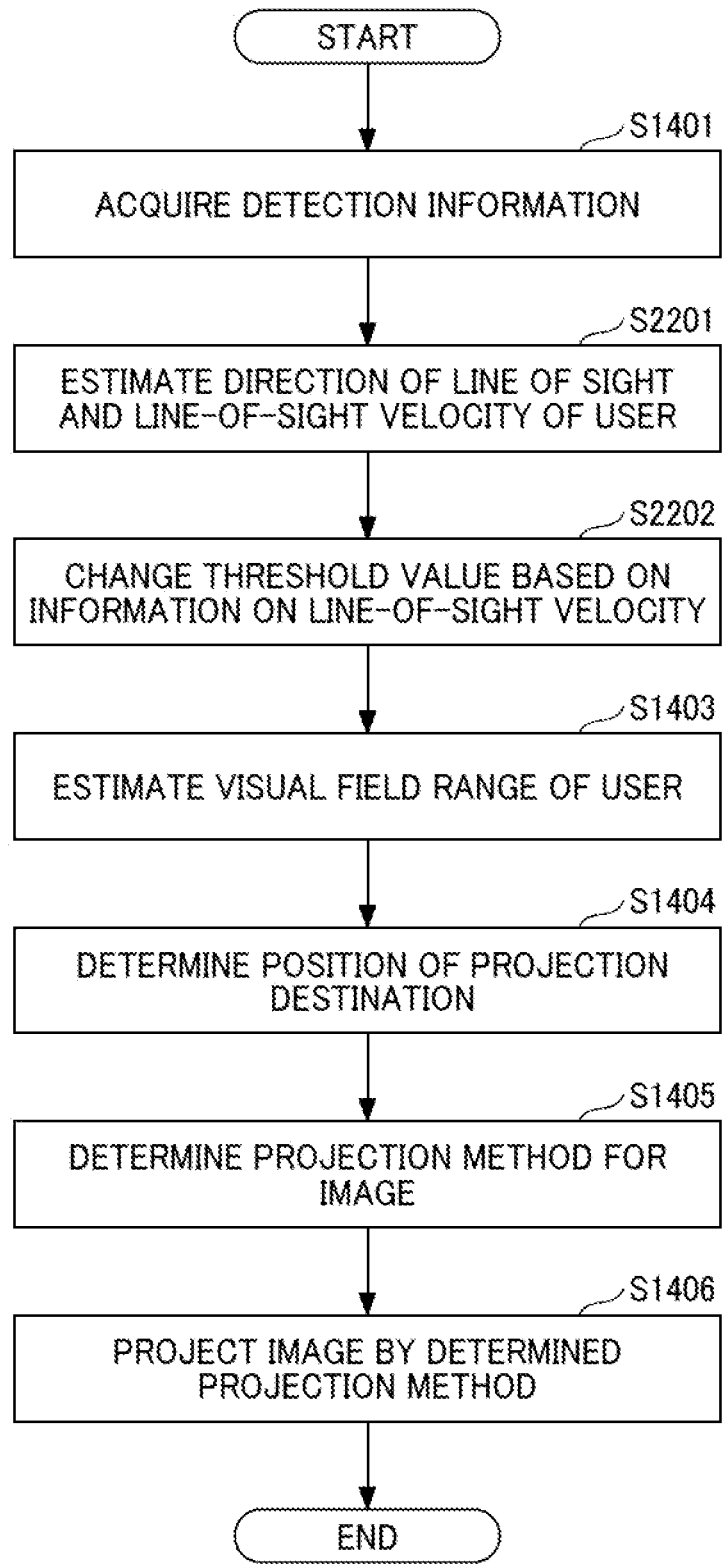
FIG. 22 is a flowchart illustrating an example of a process performed by the information display system according to a third embodiment of the disclosure.

FIG. 22 is a flowchart illustrating an example of a process performed by an information display system according to the third embodiment. Among the steps illustrated in FIG. 22, the processing of steps S1401 and S1403 to S1406 are substantially the same as the processing of the steps of the same step numerals of the process illustrated in FIG. 4 and performed by the information display system according to the above-described embodiment. Accordingly, a redundant description thereof is omitted below.

In Step S2201, the projection control unit 803 estimates the direction of the line of sight and the line-of-sight velocity of the user 2, based on the detection information acquired by the acquisition unit 802. For example, the projection control unit 803 acquires the direction of the line of sight and the line-of-sight velocity of the user 2 based on the detection information acquired from the EOG sensor 407.

In step S2202, the projection control unit 803 changes a threshold value based on the estimated line-of-sight velocity. For example, when the line-of-sight velocity within a predetermined time is equal to or less than a predetermined value, the projection control unit 803 determines that the user 2 is paying close attention to something and the field of view is narrowed, and lowers the first threshold, the second threshold, and the third threshold.

Figure 23:
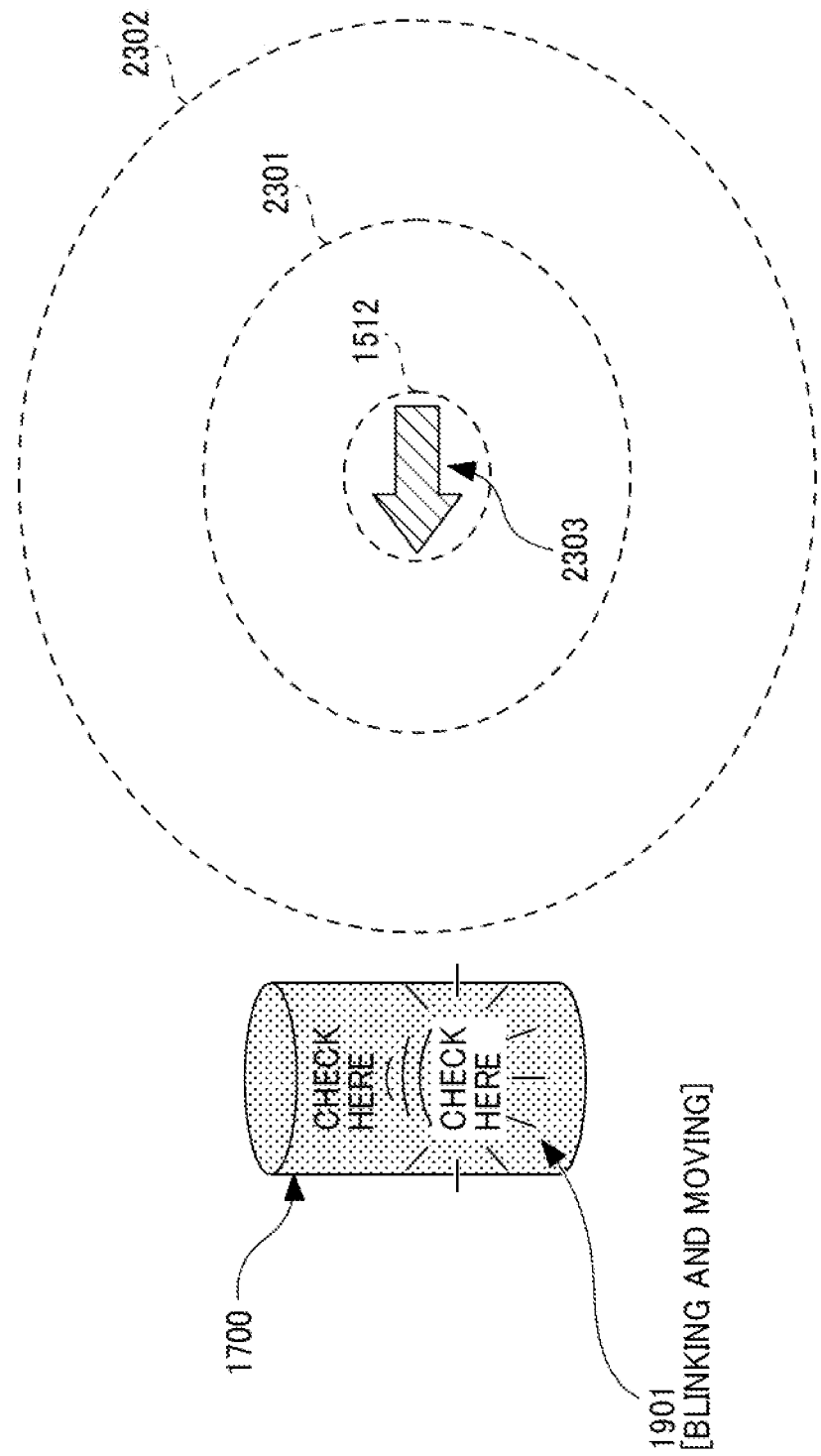
FIG. 23 is a diagram illustrating an example of a display method according to the third embodiment of the disclosure.

FIG. 23 is a diagram illustrating an example of a display method according to the third embodiment. In the example of FIG. 23, a second threshold value 2301 and a third threshold value 2302 are lowered (the values are reduced) from a state where the stable visual field 1513 is set to the second threshold value and the peripheral visual field 1514 is set to the third threshold value as illustrated in FIG. 19. In the example of FIG. 23, since the difference between the direction of the line of sight of the user 2 and the projection direction becomes equal to or greater than the third threshold value by reducing the third threshold value, the information display system 1 projects an image 2303 indicating the position or the direction of the projection destination 1700.

As described above, the information display system 1 changes one or more of the first threshold value, the second threshold value, and the third threshold value based on the line-of-sight velocity of the user 2, thereby allowing the user to more appropriately visually recognize the information related to an object to which the user 2 does not currently pay attention in his or her surroundings.

Fourth Embodiment

In the following description according to a fourth embodiment, a case where the information display system 1 projects an image onto a projection destination based on three dimensional data such as data of the Digital Twin 811 acquired from the external server 810 is described.

Figure 24:
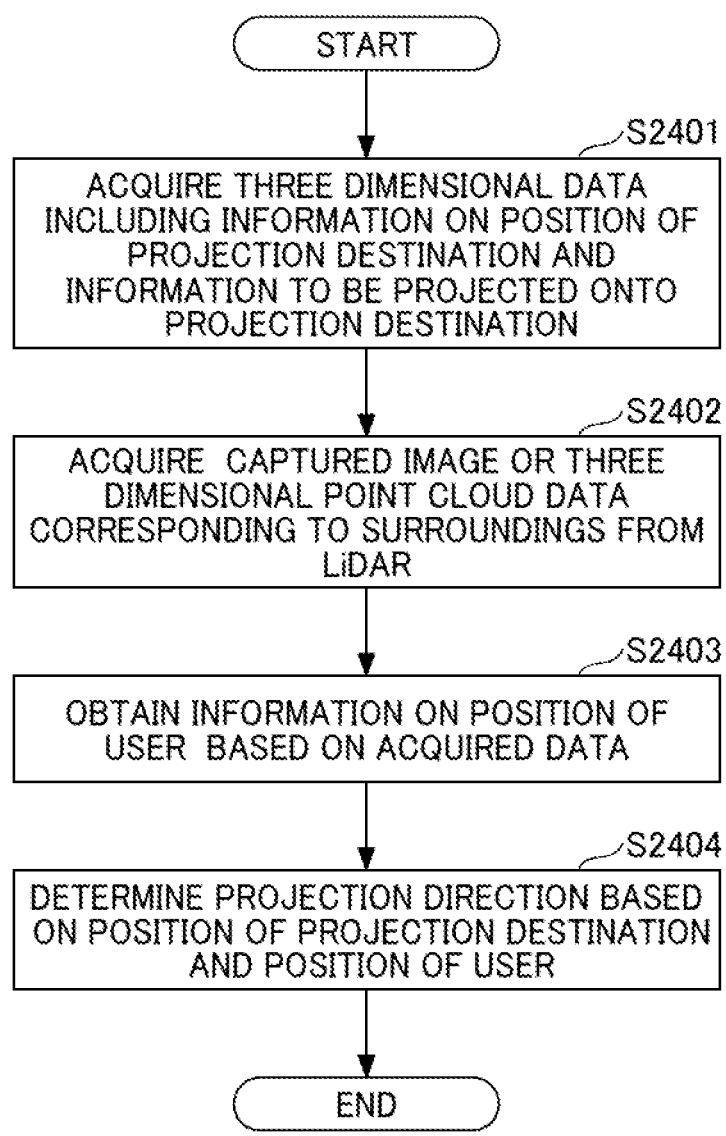
FIG. 24 is a flowchart illustrating an example of a process of determining a projection destination according to a fourth embodiment of the disclosure.

FIG. 24 is a flowchart illustrating an example of a process of determining a projection destination according to the fourth embodiment. The process is an example of a process of determining a projection destination, performed by the projection control unit 803 in step S1404 of FIG. 14.

In step S2401, the projection control unit 803 acquires three dimensional data including information on the position of the projection destination and information to be projected onto the projection destination. For example, the projection control unit 803 acquires, from the storage unit 804, the three dimensional data of the Digital Twin 811, which is acquired by the information acquisition unit 805 from the external server 810 and stored in the storage unit 804.

In step S2402, the projection control unit 803 acquires a captured image obtained by capturing an image of surroundings of the user 2 with the peripheral camera or three dimensional point cloud data of surroundings of the user 2 from the LiDAR.

For example, the projection control unit 803 acquires the three dimensional point group data of the surroundings of the user 2 by executing VSLAM on the captured image.

In step S2403, the projection control unit 803 estimates (obtains) information on the position of the user 2 based on the three dimensional data of the Digital Twin 811 and the three dimensional point cloud data of the surroundings of the user 2.

In step S2404, the projection control unit 803 determines a projection direction based on the projection destination and the position of the user obtained based on the three dimensional data of the Digital Twin 811.

Figure 25:
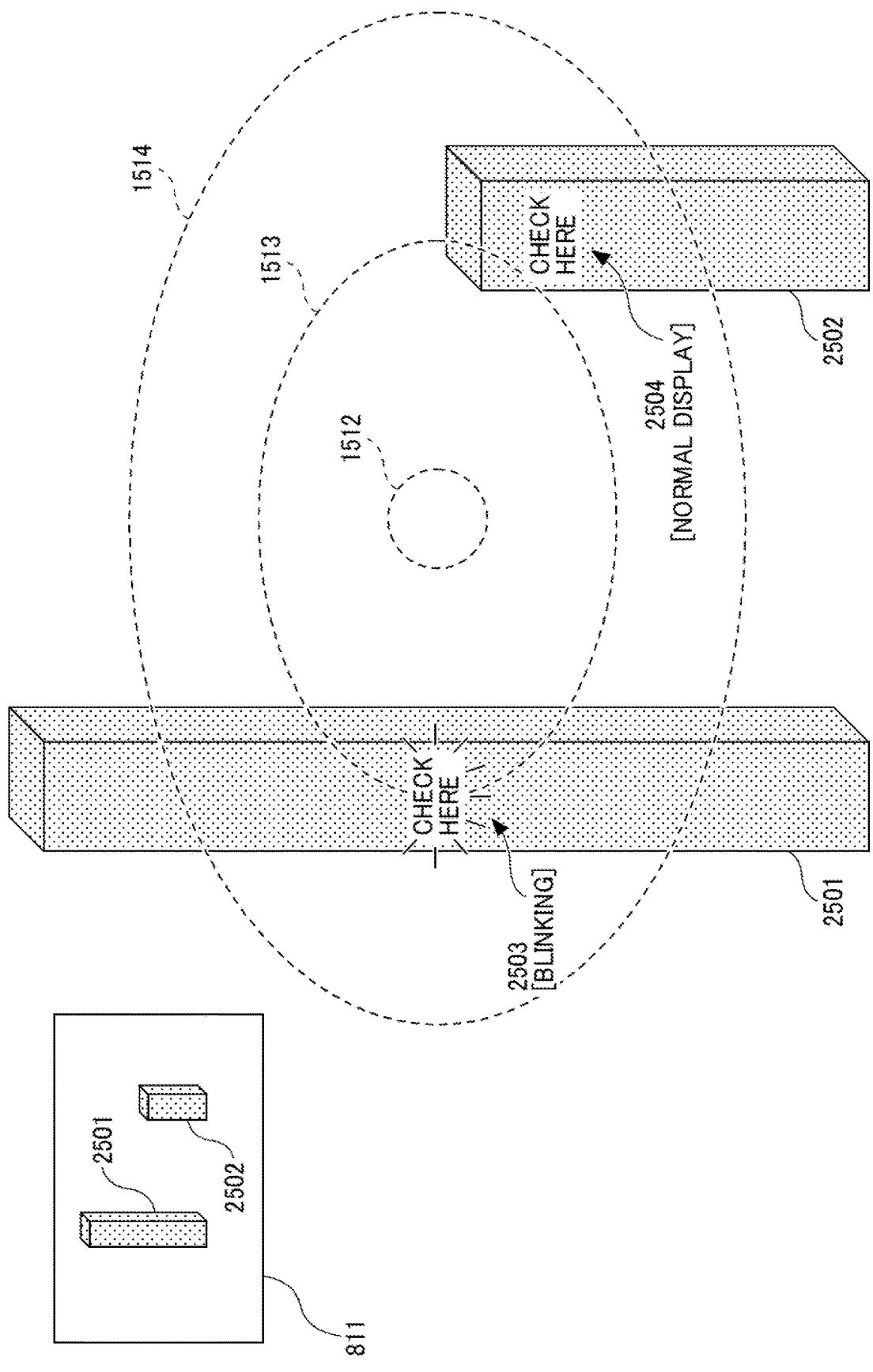
FIG. 25 is a diagram illustrating an example of a display method according to the fourth embodiment of the disclosure.

Through the processing illustrated in FIG. 24, the information display system 1 can project an image 2503 onto an actual projection destination 2501 based on the three dimensional data of the projection destination 2501 included in the Digital Twin 811, as illustrated in FIG. 25, for example.

According to the method described above, as illustrated in FIG. 25, even when a plurality of images is projected onto a plurality of projection destinations 2501 and 2502 that have similar shapes, images 2503 and 2504 can be projected more accurately based on information on positions of the a plurality of projection destinations 2501 and 2502.

As a preferable example, the three dimensional data of the Digital Twin 811 includes information indicating priorities of the plurality of projection destinations 2501 and 2502. The projection control unit 803 changes the projection method for projecting the images 2503 and 2504 onto the plurality of projection destinations 2501 and 2502, respectively, based on the priorities of the plurality of projection destinations 2501 and 2502.

In the example of FIG. 25, the information display system 1 projects to display the image 2503 on the projection destination 2501 having a higher priority in a blinking manner. In addition, the information display system 1 displays the image 2504 on the projection destination 2502 having a lower priority in a normal manner. Accordingly, the user 2 can easily understand a degree of importance of the images 2503 and 2504 projected on the plurality of projection destinations 2501 and 1502. For example, the degree of importance is determined based on input information in relation to an image to be displayed. The input information may be input in advance for setting a level of caution or attention. The degree of importance may be determined according to an object entering within a visual field first time for a predetermined period of time or a level of visual range. The degree of importance may be determined by quantify each setting in relation to caution level and summing up quantified numbers.

When the plurality of projection destinations 2501 and 2502 is located close to each other so that the images 2503 and 2504 are failed to be projected at the same time, the projection control unit 803 may project the image 2503 onto the projection destination 2501 having a higher priority.

As described above, according to the above-described embodiments, the user 2 is caused to appropriately visually recognize information related to an object to which the user 2 does not currently pay close attention in his or her surroundings, using the wearable terminal worn by the user 2.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in the above-described embodiment are merely one example of plural computing environments that implement the embodiments disclosed herein. The present disclosure, however, is not limited to the above-described embodiments, and the constituent elements of the above-described embodiments include elements that may be easily conceived by those skilled in the art, those being substantially the same ones, and those being within equivalent ranges. Various omissions, substitutions, changes, and combinations of constituent elements can be made without departing from the gist of the above-described embodiments.

In a related art, a wearable terminal is used to display more information on an object that is present within a range of a viewing angle of a user. For example, in a case of a glasses-type terminal, since an area on which information can be displayed is limited to a lens surface. Due to this, even in a case where there is an object having a degree of importance higher than that of an object to which the user currently pays attention, around the user, information indicating that there is the object having the degree of importance higher than that of the object to which the user currently pays attention may not be transmitted to the user.

According to an embodiment of the present disclosure, a user is caused to appropriately visually recognize information related to an object to which the user does not currently pay close attention in his or her surroundings, using a wearable terminal worn by the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information display system, comprising circuitry configured to:
   acquire detection information including information on a posture of a user and information on a line of sight of the user;
   project an image onto a projection destination located in a projection direction with respect to the user;
   cause the image to be projected onto the projection destination based on the detection information and information on the projection direction;
   change a projection method for the image to be projected onto the projection destination, based on a difference between a direction of the line of sight and the projection direction, the direction of the line of sight being obtained from the detection information; and
   in a case where the difference between the direction of the line of sight and the projection direction is greater than a predetermined threshold, project another image onto another projection destination based on another difference between the direction of the line of sight and another projection direction, the another difference being less than the predetermined threshold.

2. The information display system of claim 1, wherein the another image includes a display component indicating at least one of a position of the projection destination or a direction to the projection destination.

3. The information display system of claim 1, wherein the circuitry is further configured to:
   acquire information on a line-of-sight velocity related to a speed at which the direction of the line of sight changes; and
   change the projection method for the image to be projected onto the projection destination based on the information on the line-of-sight velocity.

4. The information display system of claim 1, wherein the circuitry is further configured to:
   acquire information on a line-of-sight velocity related to a speed at which the direction of the line of sight changes; and
   change the predetermined threshold based on the information on the line-of-sight velocity.

5. The information display system of claim 1, wherein the circuitry is further configured to:
   acquire information on a position of the user;
   acquire, from a memory, information on a position of the projection destination, the memory storing the information on the position of the projection destination and projection information, the projection information being information to be projected onto the projection destination; and
   determine the projection direction based on the position of the user and the position of the projection destination.

6. The information display system of claim 1, wherein the image includes a plurality of images,
   the projection destination includes a plurality of projection destinations, and
   the circuitry is further configured to
   project each of the plurality of images onto a corresponding one of the plurality of projection destinations, and
   change the projection method for each of the plurality of images according to a degree of importance of the corresponding one of the plurality of projection destinations.

7. The information display system of claim 1, wherein the circuitry is further configured to acquire the detection information with at least one of an inertial measurement device included in a wearable terminal worn by the user or a camera included in the wearable terminal.

8. The information display system of claim 1, wherein the circuitry is further configured to project the image onto the projection destination with an image projection device included in a wearable terminal worn by the user.

9. An information display method, comprising:
   acquiring detection information including information on a posture of a user and information on a line of sight of the user;
   projecting an image onto a projection destination located in a projection direction with respect to the user;
   causing the image to be projected onto the projection destination based on the detection information and information on the projection direction;
   changing a projection method for the image to be projected onto the projection destination, based on a difference between a direction of the line of sight and the projection direction, the direction of the line of sight being obtained from the detection information; and
   in a case where the difference between the direction of the line of sight and the projection direction is greater than a predetermined threshold, projecting another image onto another projection destination based on another difference between the direction of the line of sight and another projection direction, the another difference being less than the predetermined threshold.

10. A non-transitory recording medium storing a plurality of instructions which, when executed by one or more processors, causes the one or more processors to perform a method, the method comprising:
    acquiring detection information including information on a posture of a user and information on a line of sight of the user;
    projecting an image onto a projection destination located in a projection direction with respect to the user;
    causing the image to be projected onto the projection destination based on the detection information and information on the projection direction;
    changing a projection method for the image to be projected onto the projection destination, based on a difference between a direction of the line of sight and the projection direction, the direction of the line of sight being obtained from the detection information; and
    in a case where the difference between the direction of the line of sight and the projection direction is greater than a predetermined threshold, projecting another image onto another projection destination based on another difference between the direction of the line of sight and another projection direction, the another difference being less than the predetermined threshold.

\* \* \* \* \*